(12) United States Patent
Otake et al.

(10) Patent No.: US 11,081,995 B2
(45) Date of Patent: Aug. 3, 2021

(54) MOTOR CONTROL DEVICE

(71) Applicant: DENSO CORPORATION, Kariya (JP)

(72) Inventors: Hiroyasu Otake, Kariya (JP);
Nobuyori Nakajima, Kariya (JP); Go Endoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/817,964

(22) Filed: Mar. 13, 2020

(65) Prior Publication Data
US 2020/0313590 A1    Oct. 1, 2020

(30) Foreign Application Priority Data

Mar. 25, 2019 (JP) .............................. JP2019-056690

(51) Int. Cl.
| | | |
|---|---|---|
| *H02P 21/00* | (2016.01) | |
| *H02P 21/22* | (2016.01) | |
| *H02P 25/22* | (2006.01) | |
| *H02P 27/08* | (2006.01) | |
| *B62D 5/04* | (2006.01) | |
| *H02M 7/5387* | (2007.01) | |
| *B62D 6/08* | (2006.01) | |

(52) U.S. Cl.
CPC ............ *H02P 21/22* (2016.02); *B62D 5/0463* (2013.01); *H02M 7/53871* (2013.01); *H02P 25/22* (2013.01); *H02P 27/08* (2013.01); *B62D 5/0412* (2013.01); *B62D 6/08* (2013.01)

(58) Field of Classification Search
CPC .......... H02P 21/22; H02P 25/22; H02P 27/08; B62D 5/0463; H02M 7/53871

USPC ....................................................... 318/400.02
See application file for complete search history.

(56) References Cited

U.S. PATENT DOCUMENTS

| | | | |
|---|---|---|---|
| 8,305,016 B2* | 11/2012 | Okita ................... | G05B 19/404 |
| | | | 318/34 |
| 10,862,417 B2* | 12/2020 | Kuramitsu ............... | H02P 6/10 |
| 2016/0181954 A1 | 6/2016 | Satou et al. | |
| 2017/0310264 A1* | 10/2017 | Okamoto .................. | H02P 6/10 |
| | (Continued) | | |

FOREIGN PATENT DOCUMENTS

| | | |
|---|---|---|
| JP | 2018-057166 A | 4/2018 |
| JP | 2018-130007 A | 8/2018 |
| JP | 6428248 B2 | 11/2018 |

*Primary Examiner* — Erick D Glass
(74) *Attorney, Agent, or Firm* — Maschoff Brennan

(57) ABSTRACT

A motor control device includes a plurality of systems capable of controlling current supply to a motor. Each microcomputer of first and second systems is configured to communicate information of the own system and the other system by inter-computer communication and has an independent ground potential. A power supply current flowing between a power supply and a power converter is assumed to be positive and negative in a power running state and a regeneration state. Each microcomputer monitors the power supply current of each system by the inter-computer communication, and executes a power supply current balancing process of limiting a current command value or a voltage command value of at least one of the two systems thereby to decrease a power supply current difference between the two systems when the power supply current difference between the two systems exceeds a target value.

7 Claims, 16 Drawing Sheets

(56) References Cited

U.S. PATENT DOCUMENTS

2018/0091081 A1   3/2018  Suzuki et al.
2020/0136543 A1*  4/2020  Kawamura ............. H02P 25/03

* cited by examiner

MOTOR CONTROL DEVICE

CROSS REFERENCE TO RELATED APPLICATION

The present application claims the benefit of priority from Japanese Patent Application No. 2019-56690 filed on Mar. 25, 2019. The entire disclosures of the above application are incorporated herein by reference.

FIELD

The present disclosure relates to a motor control device.

BACKGROUND

A conventional motor control device includes a plurality of systems capable of controlling current supply to a motor.

For example, in a conventional rotary electric machine control device has a configuration in which power is supplied from an individual battery for each system. In this device, a rotary electric machine is driven by two systems in a coordinated manner by communicating control signals between microcomputers of the two systems. As a result, mismatch between the two systems and complexity of arbitration are reduced.

In the conventional device, when there is a difference in battery voltages, wiring resistances or the like between the two systems, a difference occurs between power supply currents flowing between the battery and an inverter circuit. Further, ground potentials of the microcomputers of the two systems may be made independent from each other in order to prevent a failure of the microcomputer in one system from propagating to the microcomputer in the other system when the microcomputer of one system fails due to a surge voltage or the like, When there occurs a difference in power supply currents of the systems in this configuration, it is likely that an inter-computer communication abnormality arises between the microcomputers due to a ground potential difference between the systems.

DETAILED DESCRIPTION OF THE EMBODIMENT

Figure 1:
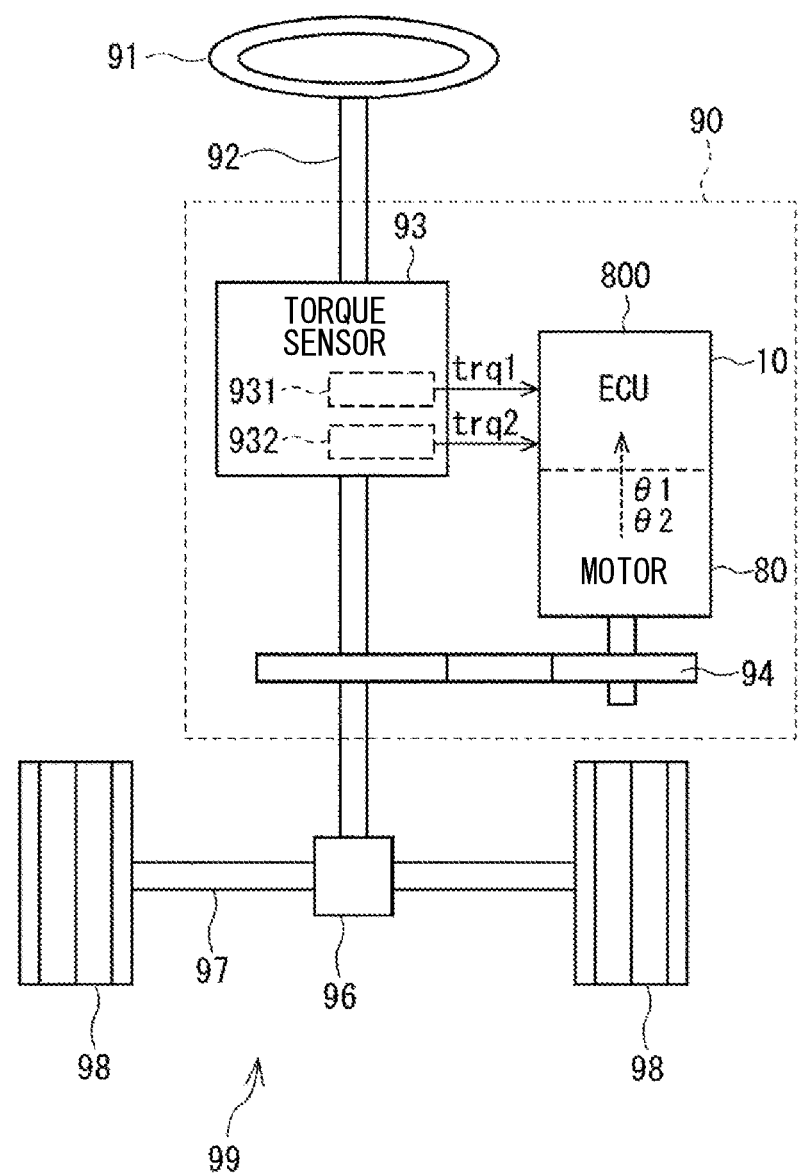
FIG. 1 is a configuration diagram of an electric power steering apparatus, in which an ECU according to each embodiment is applied to a motor of a machine-electronics integrated type.

A motor control device according to the present disclosure will be described in detail with reference to plural embodiments shown in the accompanying drawings. In each embodiment, an ECU (electronic control unit) as a motor control device is applied to an electric power steering system of a vehicle to control current supply to a steering assist motor. In the following embodiments, substantially same structural parts are designated with the same reference numerals thereby to simplify the description. The following first to third embodiments are collectively referred to as a present embodiment.

Figure 2:
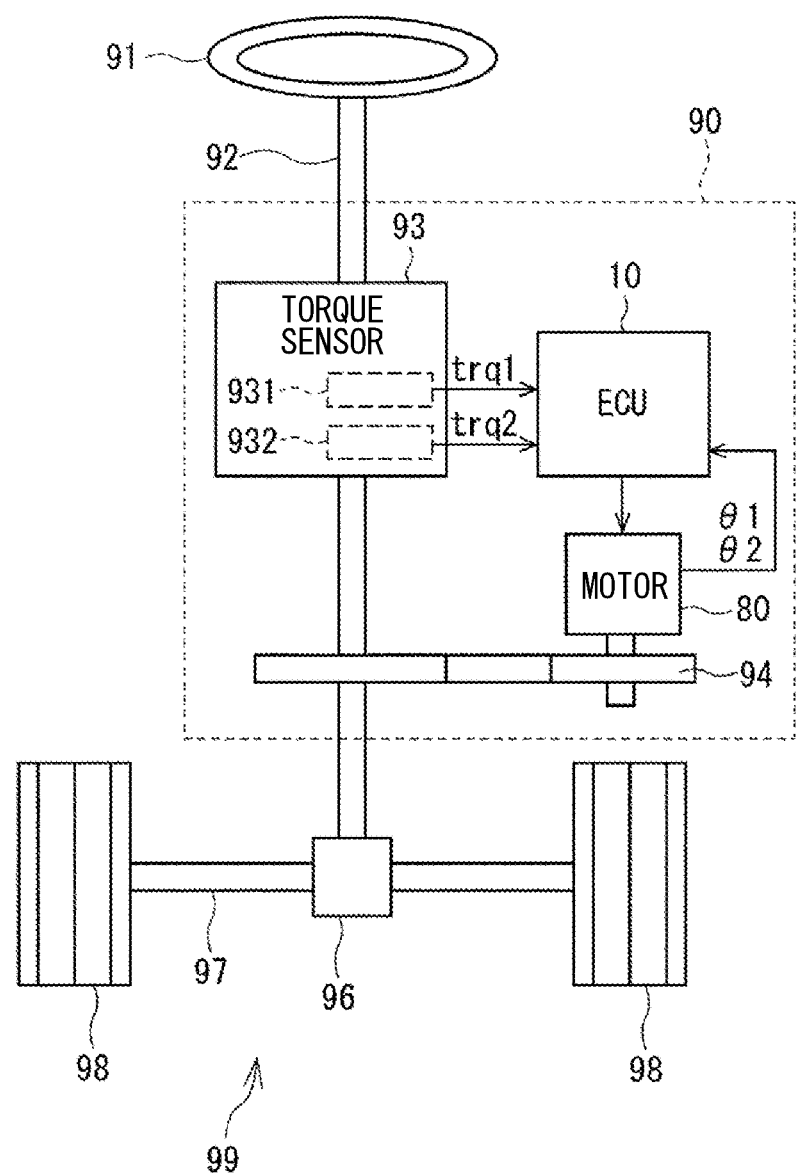
FIG. 2 is a configuration diagram of an electric power steering apparatus, in which an ECU according to each embodiment is applied to a motor of machine-electronics separated type.

First, a configuration of an electric power steering apparatus to which an electronic control unit (ECU) of the present embodiment is applied will be described with reference to FIG. 1 to FIG. 6. FIG. 1 and FIG. 2 show an overall configuration of a steering system 99 including an electric power steering apparatus 90. FIG. 1 shows a configuration of a machine-electronics integrated type in which an ECU 10 is integrally formed on one side in the axial direction of a motor 80. FIG. 2 shows a configuration of a machine-electronics separated type in which the ECU 10 and the motor 80 are separated and connected via an electric wiring harness. Although the electric power steering apparatus 90 shown in FIG. 1 and FIG. 2 is a column assist type, it may be configured to be a rack assist type.

The steering system 99 includes a steering wheel 91, a steering shaft 92, a pinion gear 96, a rack shaft 97, a pair of road wheels 98, the electric power steering apparatus 90 and the like. The steering shaft 92 is coupled to the steering wheel 91. The pinion gear 96 provided at an axil end of the steering shaft 92 engages with the rack shaft 97. The pair of road wheels 98 is provided at both ends of the rack shaft 97 via, for example, tie rods. When a driver rotates the steering wheel 91, the steering shaft 92 coupled to the steering wheel 91 rotates. A rotational movement of the steering shaft 92 is converted into a linear movement of the rack shaft 97 by the pinion gear 96 and the pair of road wheels 98 is steered to an angle corresponding to a displacement amount of the rack shaft 97.

The electric power steering apparatus 90 includes a steering torque sensor 93 in addition to the ECU 10, the motor 80, the reduction gear 94 and the like. The steering torque sensor 93 is provided at an intermediate portion of the steering shaft 92 to detect a steering torque applied by the driver. In the embodiment shown in FIG. 1 and FIG. 2, the steering torque sensor 93 is a dual type, which includes a first torque sensor 931 and a second torque sensor 932, and detects a first steering torque trq1 and a second steering torque trq2, respectively, in a dual manner. In case that the steering torque sensing elements are not provided redundantly, a detected value of one steering torque trq may be used in common for the dual systems. Hereinafter, where the steering torques trq1 and trq2 are redundantly detected but not essential in the following description, the two torques trq1 and trq2 are referred to simply as one steering torque trq.

Figure 6:
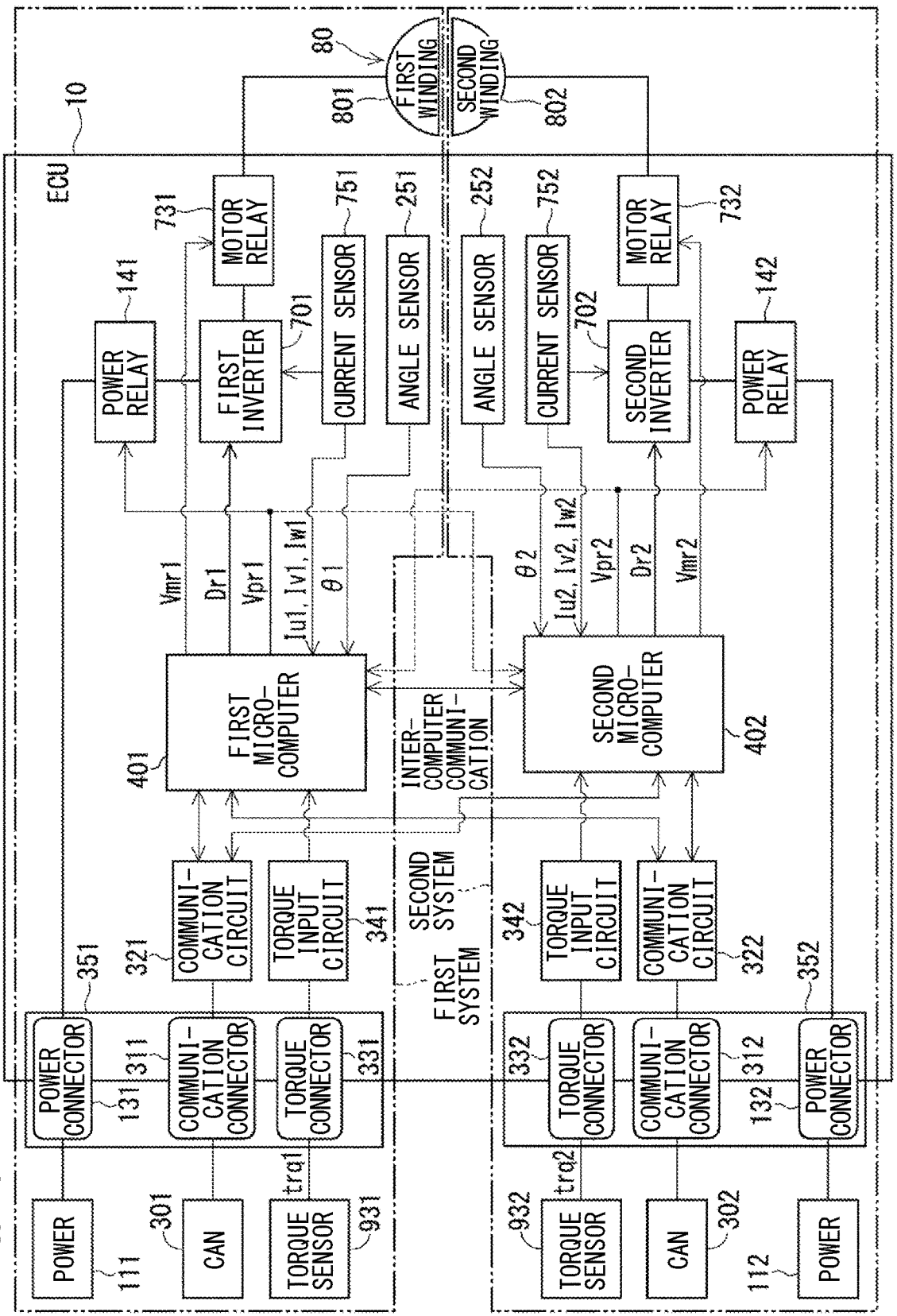
FIG. 6 is an overall configuration diagram of a two-system ECU (motor control device)

The ECU 10 is configured to control driving of the motor 80 so that the motor 80 generates a desired assist torque based on the steering torques trq1 and trq 2 at the time of power running of a vehicle. The assist torque generated by the motor 80 is transmitted to the steering shaft 92 via the reduction gear 94. Further, the ECU 10 is configured to restore electric energy of the counter-electromotive force, which is generated in the motor 80 by reverse input or steering operation during a regenerative operation, to power supply batteries 111 and 112 (FIG. 6). The ECU 10 is configured to acquire phase currents of the motor 80 and electrical angles θ1 and 02 detected by current sensors 751, 752 (FIG. 6) and rotation angle sensors 252, 252 (FIG. 6), and control current supply to the motor 80 based on these information.

Figure 3:
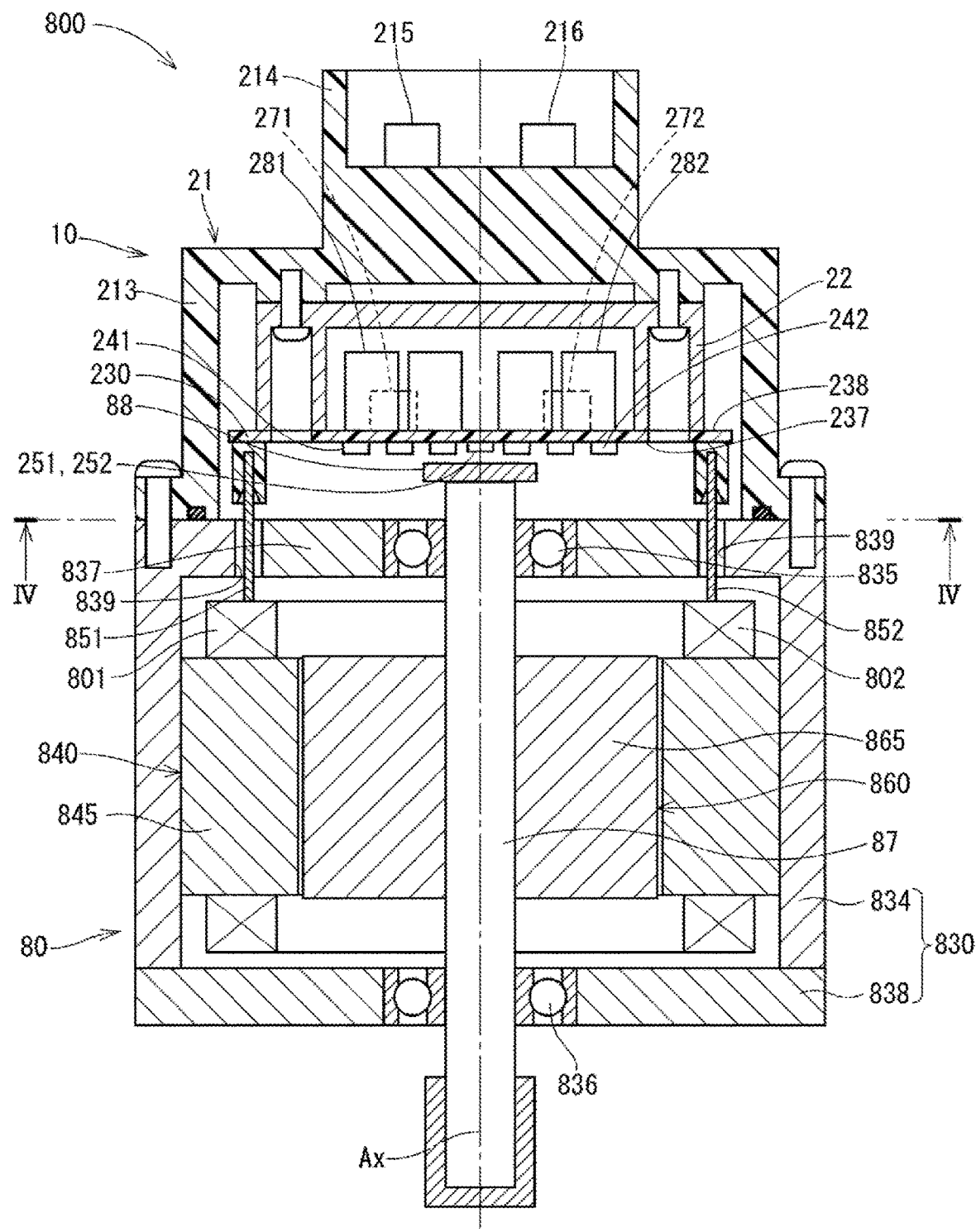
FIG. 3 is an axial cross-sectional view of a motor of machine-electronics integrated type for two systems.
Figure 4:
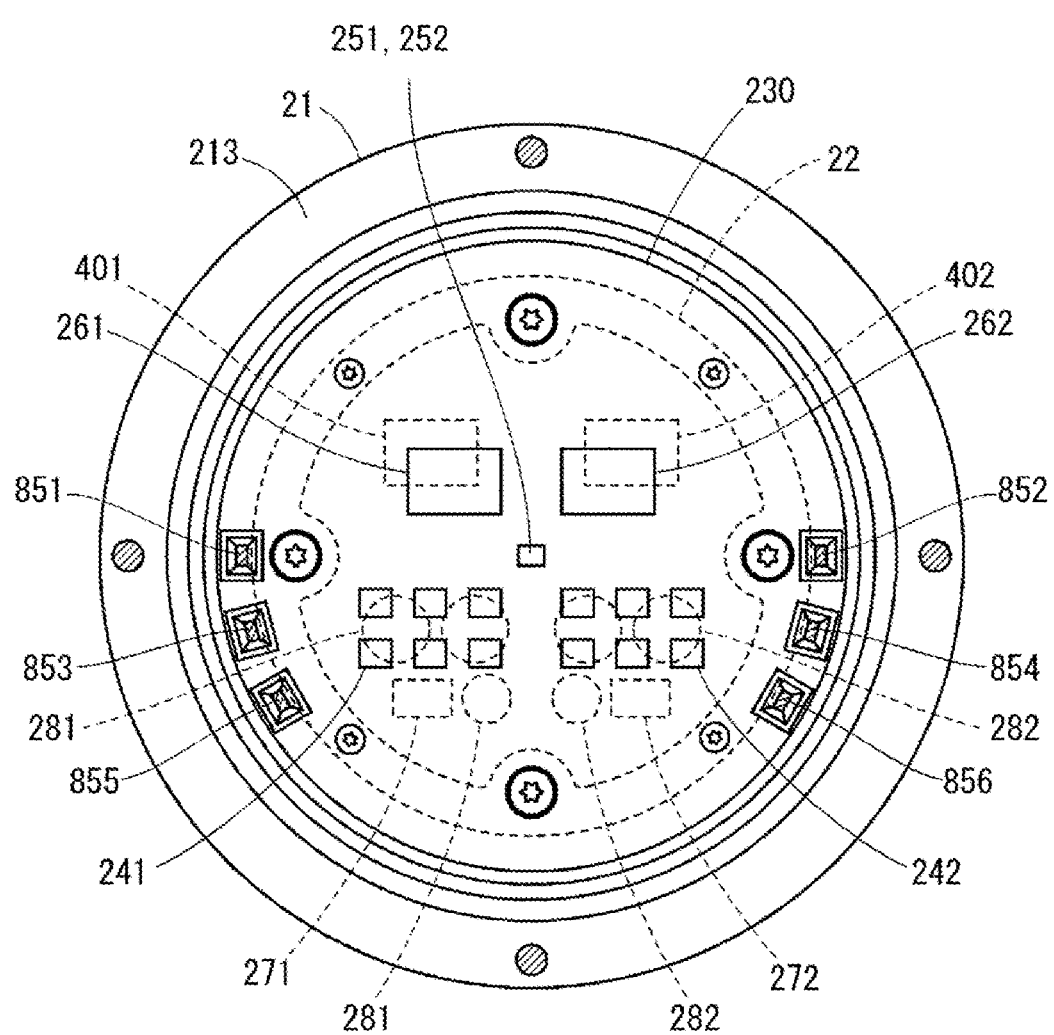
FIG. 4 is a cross-sectional view taken along a line IV-IV in FIG. 3.

The configuration of the motor 80 of the machine-electronics integrated type in which the ECU 10 is integrally formed on one axial side of the motor 80 will be described with reference to FIG. 3 and FIG. 4. As shown in FIG. 3, the ECU 10 is positioned coaxially with an axis Ax of the shaft 87 on the side opposite to an output side of the motor 80. As another embodiment, the ECU 10 may be configured integrally with the motor 80 on the output side of the motor 80. The motor 80 is a three-phase brushless motor which includes a stator 840, a rotor 860 and a housing 830 which houses them.

The stator 840 has a stator core 845 fixed to the housing 830 and two groups of three-phase first and second winding sets 801 and 802 assembled to the stator core 845. Lead wires 851, 853 and 855 extend from each phase winding forming the first winding set 801. Lead wires 852, 854 and 856 extend from each phase winding forming the second winding set 802. The rotor 860 has a shaft 87, which is supported by a rear bearing 835 and a front bearing 836, and a rotor core 865, into which the shaft 87 is firmly fitted. The rotor 860 is provided radially inside the stator 840 to be rotatable relative to the stator 840. A permanent magnet 88 is attached to one axial end of the shaft 87.

The housing 830 has a bottomed cylindrical case 834, which has a rear end frame 837, and a front end frame 838, which is provided on an open end side of the case 834. The case 834 and the front end frame 838 are fastened to each other by bolts or the like. The lead wires 851, 852 and the like of each winding set 801, 802 are passed through lead wire insertion holes 839 of the rear end frame 837 to extend to the ECU 10 side and are connected to a circuit board 230 of the ECU 10.

The ECU 10 includes a cover 21, a heat sink 22 fixed to the cover 21, the circuit board 230 fixed to the heat sink 22 and other electronic components mounted on the circuit board 230. The cover 21 is provided to protect circuit electronic components from external impacts and to prevent dust and water from entering into the ECU 10. The cover 21 has a cover portion 213 and an external connection connector portion 214 for connection with external power supply cables and signal cables. Power supply terminals 215 and 216 of the external connection connector portion 214 are connected to the circuit board 230 via paths not shown.

The circuit board 230 is, for example, a printed circuit substrate and is positioned to face the rear end frame 837 and fixed to the heat sink 22. On the circuit board 230, the electronic components of the first and second systems are mounted independently for each system so that the two systems are provided in a fully redundant configuration. In the present embodiment, the circuit board 230 is provided singly but, as another embodiment, two or more circuit boards may be provided. Of two main surfaces of the circuit board 230, a surface facing the rear end frame 837 is referred to as a motor-side surface 237 and a surface opposite to the motor-side surface 237, that is, a surface facing the heat sink 22 is referred to as a cover-side surface 238.

On the motor-side surface 237, a plurality of switching elements 241, 242, rotation angle sensors 251, 252, custom ICs 261, 262 and the like are mounted. In the present embodiment, there are six switching elements 241 and 242 for each system, and constitute a three-phase upper (high-potential side) and lower arm (low-potential side) of an inverter as a power converter. The rotation angle sensors 251 and 252 are positioned to face the permanent magnet 88 provided at the axial end of the shaft 87. The custom ICs 261, 262 and microcomputers 401, 402 are provided as control circuits of the ECU 10.

Figure 5:
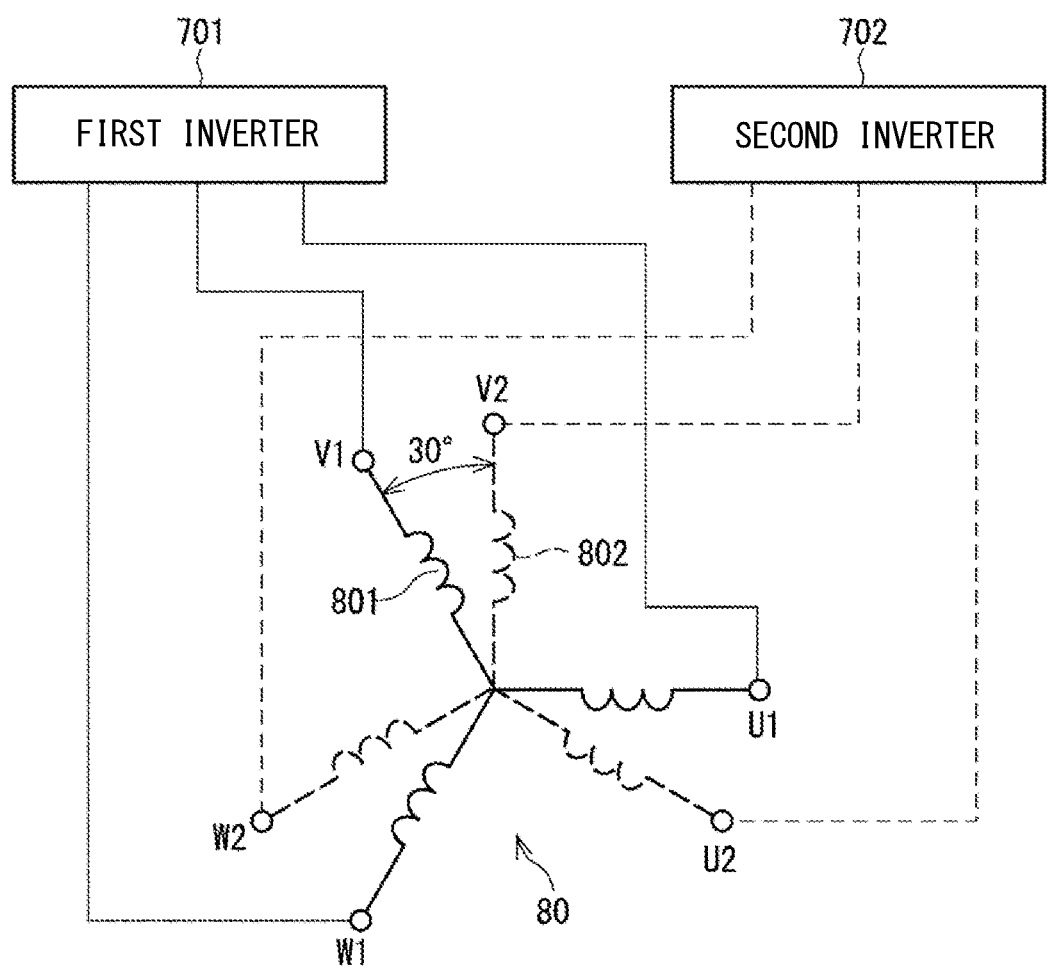
FIG. 5 is a schematic view showing a configuration of a multi-phase coaxial motor.

On the cover-side surface 238, the microcomputers 401, 402, capacitors 281, 282, inductors 271, 272 and the like are mounted. In particular, the first microcomputer 401 and the second microcomputer 402 are positioned on the same cover-side surface 238 of the same circuit board 230 with a predetermined distance therebetween. The capacitors 281 and 282 smoothen an input power supplied from the power supply batteries 111 and 112 and prevent noise generated and flowing out due to the switching operation or the like of the switching elements 241 and 242, respectively. The inductors 271 and 272 form filter circuits together with the capacitors 281 and 282, respectively As shown in FIG. 5 and FIG. 6, the motor 80 to be controlled by the ECU 10 is the three-phase brushless motor which has two pairs of three-phase winding sets 801 and 802 provided coaxially. The winding sets 801 and 802 have the same electrical characteristics and are wound on a common stator while being shifted from each other by an electrical angle of 30 degrees. For this reason, the phase currents supplied to the winding sets 180 and 280 are controlled to have a same amplitude and a phase difference of 30 degrees.

[Configuration of ECU (Motor Control Device)]

Next, with reference to FIG. 6, the configuration and operational effects of the ECU 10 will be described. The ECU 10 is mounted in a vehicle and drives one motor 80 by two systems provided redundantly. Hereinafter, a unit of a group of components including microcomputers 401 and 402 and inverters 701 and 702 as power converters provided in correspondence with each other is referred to as a system. In FIG. 6, a combination of the first winding set 801 and the first microcomputer 401 and the inverter 701 related to the current supply control for the first winding set 801 forms a first system. A combination of the second winding set 802 and the second microcomputer 402, the second inverter 702, and the like related to the current supply control for the second winding set 802 forms a second system. The first system and the second system are all composed of two independent element groups.

In the description, when necessary, "first" and "second" are attached to structural components and signals of the first system and the second system for distinction. However, when not necessary, "first" and "second" are not attached. Further, the structural components and signals in the first system and the second system are distinguished with "1" and "2" at the end of the reference numerals, respectively. Hereinafter, for a certain structural component, the system including such a component is referred to as an own system, and another system is referred to as the other system.

A first connector unit 351 of the ECU 10 includes a first power supply connector 131, a first vehicle communication connector 311 and a first torque connector 331. A second connector unit 352 includes a second power supply connector 332, a second vehicle communication connector 312 and a second torque connector 332. Each of the connector units 351 and 352 may be formed as a single connector unit or may be separated into a plurality of connectors. The first power connector 131 is connected to a first power supply (for example, battery) 111. Power of the first power supply 111 is supplied to the first winding set 801 via the power supply connector 131, a power supply relay 141, the first inverter 701 and a motor relay 731. The power of the first power supply 111 is also supplied to the first microcomputer 401 and sensors of the first system.

The second power supply connector 352 is connected to a second power supply (for example, battery) 112. Power of the second power supply 112 is supplied to the second winding set 802 via the power supply connector 132, a power supply relay 142, the second inverter 702 and a motor relay 732. The power of the second power supply 112 is also supplied to the second microcomputer 402 and the sensors of the second system.

In case CAN (controller area network) is redundantly provided as a vehicle communication network, the first vehicle communication connector 311 is connected between a first CAN 301 and a first vehicle communication circuit 321, and the second vehicle communication connector 312 is connected between a second CAN 302 and a second vehicle communication circuit 322. In case the CANs are not provided redundantly, the vehicle communication connectors 311 and 312 may be connected to a common CAN 30. As a vehicle communication network other than CAN, a network of any standard such as CAN-FD (CAN with Flexible Data rate) or FlexRay may be used. The vehicle communication circuits 321 and 322 mutually communicate information with the microcomputer 401 of the own system and the microcomputer 402 of the other system.

The first torque connector 331 is connected between the first torque sensor 931 and a first torque sensor input circuit 341. The first torque sensor input circuit 341 notifies the first microcomputer 401 of the steering torque trq1 detected by the first torque connector 331. The second torque connector 332 is connected between the second torque sensor 932 and a second torque sensor input circuit 342. The second torque sensor input circuit 342 notifies the second microcomputer 402 of the steering torque trq2 detected by the second torque connector 332.

The microcomputers 401 and 402 calculate current command values and current limit values for the currents that are supplied to the winding sets 801 and 802, respectively. Then, the microcomputers 401 and 402 output motor drive signals Dr1 and Dr2 generated based on the current command values and the current limit values to the inverters 701 and 702, respectively. Each process in the microcomputers 401 and 402 may be a software process in which a CPU executes a program stored in a memory device such as a ROM, or a hardware process by a dedicated electronic circuit.

The first microcomputer 401 generates a motor drive signal Dr1 for controlling operations of the switching elements 241 of the first inverter 701, and controls the operation of the first inverter 701. In addition, the first microcomputer 401 generates a first power supply relay drive signal Vpr1 and a first motor relay drive signal Vmr1. The second microcomputer 402 generates a motor drive signal Dr2 for controlling the operations of the switching elements 242 of the second inverter 702, and controls the operation of the second inverter 702. The second microcomputer 402 generates a second power relay drive signal Vpr2 and a second motor relay drive signal Vmr2. The power supply relay drive signals Vpr1 and Vpr2 generated by the microcomputers 401 and 402 are supplied to the power supply relays 141 and 142 of the own system and are also notified to the other microcomputer.

The microcomputers 401 and 402 are configured to communicate information such as a current command value and a current detection value with each other through inter-computer communication between microcomputers. A communication frame for the inter-computer communication includes a current command value, a current limit value, a current detection value and the like. In addition, the communication frame may include an update counter, a status signal, a CRC signal that is an error detection value signal, a checksum signal and the like.

In case that each microcomputer 401, 402 receives the power supply relay drive signal Vpr1, Vpr2 from the other microcomputer, but does not receive signals from the other microcomputer through the inter-computer communication, the other microcomputer is determined to be normal and the inter-computer communication is determined to be abnormal. On the other hand, in case that each microcomputer 401, 402 does not receive the power supply relay drive signals Vpr1, Vpr2 from the other microcomputer and does not receive the signal from the other microcomputer through the inter-computer communication, it is determined that the other microcomputer is abnormal.

The first and second inverters 701 and 702 are provided corresponding to the first and second winding sets 801 and 802, respectively. The first inverter 701 is a three-phase inverter having a plurality of switching elements 241 and converts electric power supplied to the first winding set 801. On/off operation of each switching element 241 of the first inverter 701 is controlled based on the motor drive signal Dr1 output from the first microcomputer 401. The second inverter 702 is also a three-phase inverter having a plurality of switching elements 242 and converts power supplied to the second winding set 802. On/off operation of each switching element 242 of the second inverter 702 is controlled based on the motor drive signal Dr2 output from the second microcomputer 402.

The first power supply relay 141 is provided between the first power supply connector 131 and the first inverter 701 and is controlled by the first power supply relay drive signal Vpr1 supplied from the first microcomputer 401. When the first power supply relay 141 is in the on-state, current supply between the first power supply 111 and the first inverter 701 is allowed. When the first power supply relay 141 is in the off-state, the current supply between the first power supply 111 and the first inverter 701 is turned off.

The second power supply relay 142 is provided between the second power supply connector 132 and the second inverter 702, and is controlled by the second power relay drive signal Vpr2 supplied from the second microcomputer 402. When the second power supply relay 142 is in the on-state, the current supply between the second power supply 112 and the second inverter 702 is allowed. When the second power supply relay 142 is in the off-state, the current supply between the second power supply 112 and the second inverter 702 are turned off.

The power supply relays 141 and 142 in the present embodiment are semiconductor relays such as MOSFETs. In case that the power supply relays 141 and 142 such as MOSFETs have parasitic diodes, it is desirable to provide reverse-connection protection relays (not shown) in series to the power supply relays 141 and 142, respectively, such that the directions of the parasitic diodes are opposite to each other. Further, the power supply relays 141 and 142 may be mechanical relays.

The first motor relay 731 is provided in a power supply path of each phase between the first inverter 701 and the first winding set 801, and is controlled by the a motor relay drive signal Vmr1 supplied from the first microcomputer 401. The second motor relay 732 is provided in a power supply path of each phase between the second inverter 702 and the second winding set 802, and is controlled by a second motor relay drive signal Vmr2 supplied from the second microcomputer 402. When the motor relays 731 and 732 are in on-states, current supplies between the inverters 701 and 702 and the winding sets 801 and 802 are allowed, respectively. When the motor relays 731 and 732 are in off-states, current supplies between the inverters 701 and 702 and the winding sets 801 and 802 are turned off, respectively.

The first current sensor 751 detects three phase currents Iu1, Iv1 and Iw1 of the first winding set 801 and outputs them to the first microcomputer 401. The second current sensor 752 detects three phase currents Iu2, Iv2 and Iw2 of the second winding set 802 and outputs them to the second microcomputer 402. In case that the rotation angle sensors 251 and 252 are redundantly provided, the first rotation angle sensor 251 detects the electrical angle θ1 of the motor 80 and outputs it to the first microcomputer 401. The second rotation angle sensor 252 detects the electrical angle θ2 of the motor 80 and outputs it to the second microcomputer 402. In case the rotation angle sensors 251 and 252 are not provided redundantly, for example, the second system electrical angle θ2 may be calculated as θ2=θ1+30 based on the electrical angle θ1 of the first system detected by the first rotation angle sensor 251.

Figure 7:
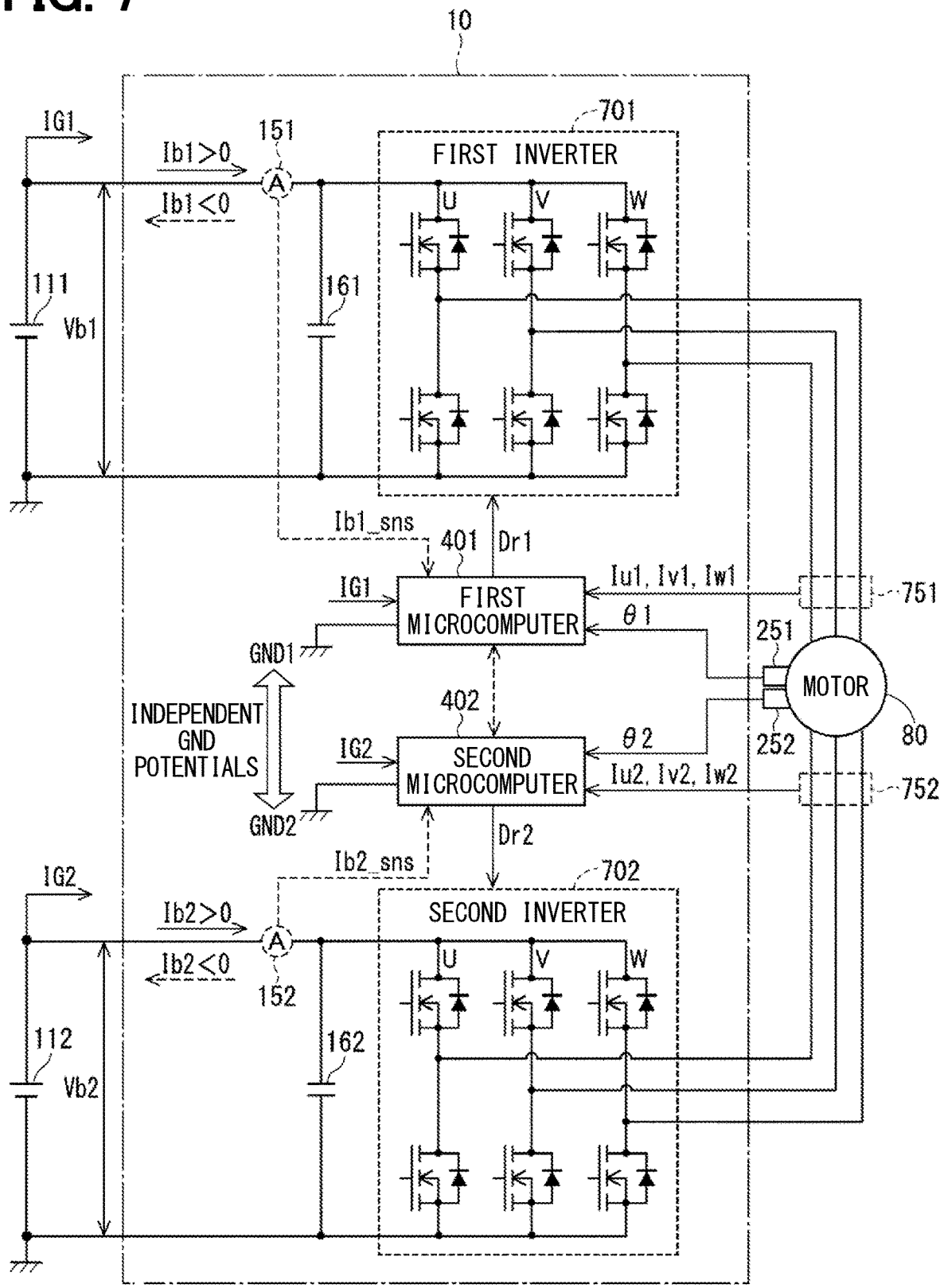
FIG. 7 is a diagram for explaining a power supply current of each system in the two-system ECU.

Next, with reference to FIG. 7, power supply currents Ib1 and Ib2 flowing through each system of the ECU 10 will be mainly described from the viewpoint of the hardware configuration. In FIG. 7, the power supply connectors 131 and 132, the power supply relays 141 and 142, the motor relays 731 and 732 and the like shown in FIG. 6 are not shown for simplification. The redundantly provided first system and the second system control the current supply to the motor 80. The inverter 701, 702 provided as the power converter in each system performs power conversion between the DC power input from individual power supply 111, 112 and the AC power generated in the motor 80 in accordance with the operation state, that is, a power running state or a regeneration state. Smoothing capacitors 161 and 162 are connected to the power supplies 111 and 112 of the inverters 701 and 702, respectively.

In the electric power steering apparatus, the operation of causing the motor 80 to output the assist torque in accordance with the driver's steering torque is a power running operation. Further, the operation of generation of a counter-electromotive force of the motor 80, which occurs when the steering wheel 91 is operated in a no-load state, for example, when the vehicle turns over because of the road wheels 98 riding on a road obstacle or when the road wheels are jacked up, is a regeneration operation. For example, in the first system, the power supply current Ib1 flows from the first power supply 111 toward the first inverter 701 during the power running operation, and flows from the first inverter 701 toward the first power supply 111 during the regeneration operation. In the following description, the signs of the power supply currents Ib1 and Ib2 are assumed to be positive in the power running operation and negative in the regeneration operation. That is, the power supply current Ib1, Ib2 of the positive sign is a power running current and the power supply current Ib1, Ib2 of the negative sign is a regeneration current.

In case there are differences in the power supply voltages Vb1 and Vb2 and wiring resistances between the systems, a difference arises in the power supply currents Ib1 and Ib2 between the two systems. For example, detected values Ib1_sns and Ib2_sns of the power supply currents detected by the power supply current sensors 151 and 152 indicated by broken lines may be acquired by the microcomputers 401 and 402, respectively. However, in the first to third embodiments, power supply current sensor is not provided, and the microcomputer 401, 402 of each system calculates estimated power supply current Ib1_est, Ib2_est (see FIG. 9) that is an estimated value of the power supply current.

The microcomputers 401, 402 of each system calculates current command values for the current flowing through the motor 80. Further, for example, the microcomputer 401 of the first system uses phase currents Iu1, Iv1 and Iw1 acquired from the current sensor 751 and the electrical angle θ1 acquired from the rotation angle sensor 251 and calculates dq axis currents Id1 and Iq1 (FIG. 9) as an actual current flowing in the motor 80. The first microcomputer 401 calculates a voltage command value which is commanded to the first inverter 701 of its own system by feedback control of the actual current with respect to the current command value. The second microcomputer 402 calculates its voltage command value for the second system in the similar manner.

Here, when generalized to a plurality of systems including three or more systems, a set of two or more systems selected from a plurality of systems is defined as a target system pair. In the present embodiment, the first system and the second system are simply selected as the target system pair out of the two systems assuming that there are no other systems. That is, the first microcomputer 401 and the second microcomputer 402 correspond to each microcomputer of the target system pair. The concept of target system pair in case that systems other than the first system and the second system exist will be described later.

The first microcomputer 401 and the second microcomputer 402 are configured to be able to communicate with each other information about the own system and the other system through inter-computer communication executed between microcomputers. The operating powers of the microcomputers 401 and 402 are input to the respective systems from the individual power supplies 111 and 112 via different control power lines IG1 and IG2. It is noted that, although "IG" is used conventionally to indicate "ignition," the vehicle to which the present embodiment is applied is not limited to an engine-powered vehicle, but may be an engine-motor-powered hybrid vehicle or a motor-powered electric vehicle.

In this embodiment, it is assumed that the potentials of the grounds GND1 and GND2 of the microcomputers 401 and 402 are independent from each other at least in a target system pair that performs the inter-computer communication. A configuration in which a capacitor is connected between the grounds GND1 and GND2 of the microcomputer is included in the configuration in which the ground potentials are independent from each other, because the conduction of the DC component is cut off by such a capacitor. The configuration in which the ground potentials are independent from each other is used to prevent a failure from affecting on a microcomputer in another system when a microcomputer in a certain system fails due to a surge voltage or the like. In case of systems having a common ground potential, there arises no critical problem substantially, even if a difference occurs in power supply currents. However, if there arises a difference between the power supply currents Ib1 and Ib2 between the systems whose ground potentials are independent, it is likely that a communication abnormality may occur between the microcomputers due to the ground potential difference between the systems.

Therefore, in the present embodiment, the microcomputers 401 and 402 of the two systems mutually monitor the detected values Ib1_sns and Ib2_sns or the estimated values Ib1_est and Ib2_est of each system through the inter-computer communication. When a power supply current difference ΔIb between the two systems exceeds a target power supply current difference ΔIb_lim, the microcomputers 401 and 402 in each system reduce the power supply current difference ΔIb between the two systems, preferably the power supply current difference ΔIb is reduced to be equal to or smaller than the target power supply current difference ΔIb_lim. In another embodiment, the microcomputers 401 and 402 of each system may mutually monitor information that can estimate the power supply current of each system in addition to the detected values Ib1_sns and Ib2_sns of the power supply current or the estimated values Ib1_est and Ib2_est, as described later.

This process executed in the present embodiment is referred to as a power supply current balancing process. The target power supply current difference ΔIb_lim is set to be equal to or smaller than a value determined by dividing an allowable ground potential difference by a wiring resistance. Specifically, the microcomputers 401 and 402 reduce the power supply current difference ΔIb between the two systems by limiting the current command value or voltage command value of any one of systems. In the present embodiment, limitation of the current command value or the voltage command value is exemplified to change to be close to 0. That is, in case that the command value is a positive value, it is decreased and brought close to 0. In case that the command value is a negative value, it is increased and brought close to 0. The power supply current difference ΔIb is a value determined by subtracting a small value from a large value, that is, the power supply current difference is equal to or larger than 0 (ΔIb≥0).

Figure 8:
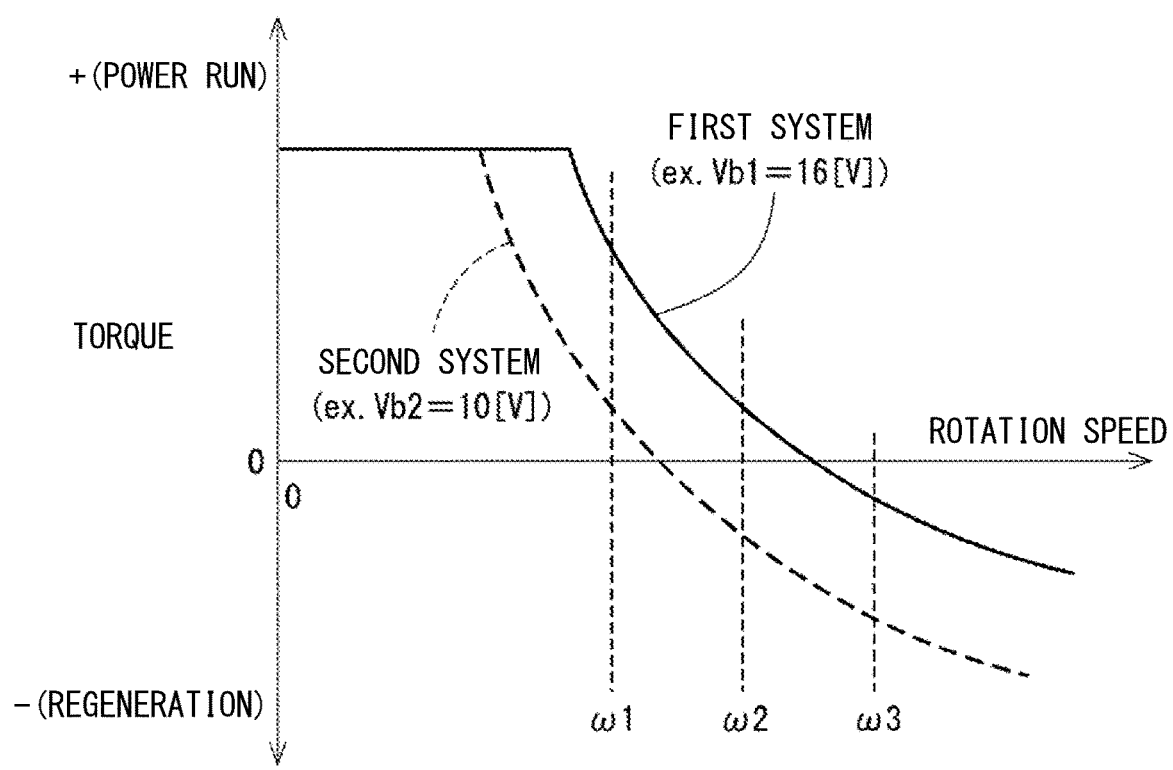
FIG. 8 is a rotation speed-torque characteristic diagram for explaining a power running/regeneration operation when there is a difference between power supply voltages of two systems.

Further, the rotational speed-torque characteristics in case of a difference between the power supply voltages of the two systems is shown in FIG. 8. For example, in case that the voltage Vb1 of the first power supply 111 is 16 [V] and the voltage Vb2 of the second power supply 112 is 10 [V], the rotational speed-torque characteristics of the first system and the second system have an offset relationship. When the rotation speed is w1, both the first system and the second system are in the power running states. When the rotation speed is ω2, the first system is in the power running state and the second system is in the regeneration state. When the rotation speed is w3, both the first system and the second system are in the regeneration states. A combination of these three patterns of operation states is referred to as a power running and power running state (power+power state), a power running and regeneration state (power+regeneration state), and a regeneration and regeneration state (regeneration+regeneration state).

Next, the detailed configuration of the ECU 10 of the present embodiment and the operational effects of the power supply current balancing process will be described for each embodiment. The ECU of each embodiment is denoted with a reference numeral, which has the number of each embodiment in the third digit following the reference numeral 10. In the power supply current balancing process, the current command value is limited in the first embodiment, and the voltage command value is limited in the second embodiment. In the third embodiment, both the current command value and the voltage command value are limited.

The limitation of the power supply current in the power running state can be performed by any of the limitation of the current command value and the limitation of the voltage command value. On the other hand, there is a difference that the limitation of the power supply current in the regeneration state cannot be performed by limiting the current command value, and can be performed only by limiting the voltage command value. Therefore, each embodiment differs in a part of operational effect depending on the operation states of the two systems.

First Embodiment

Figure 9:
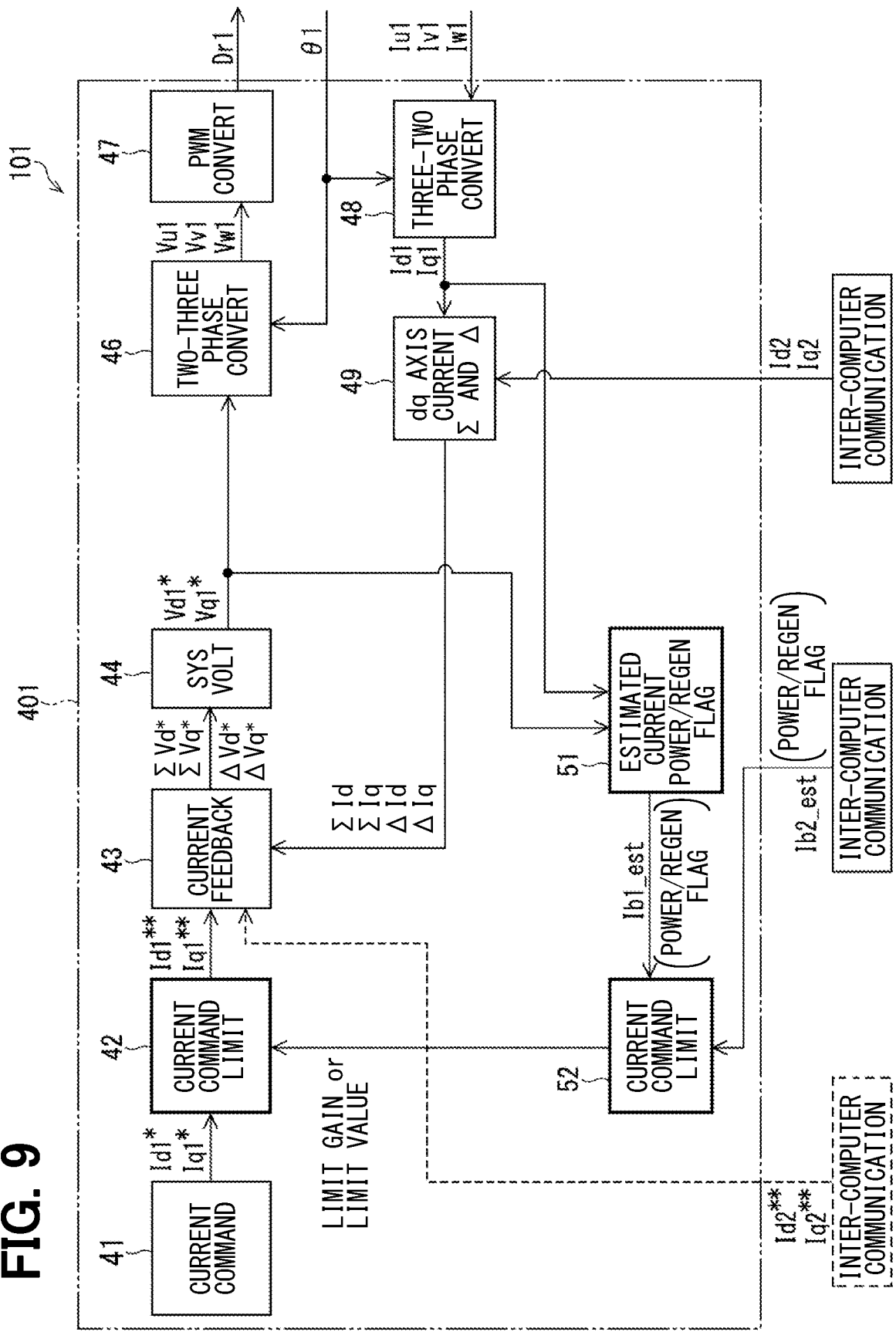
FIG. 9 is a block diagram of current feedback control according to a first embodiment.

The first embodiment for limiting the current command value will be described with reference to FIG. 9 and FIG. 10. FIG. 9 shows a configuration of current feedback control of an ECU 101 of the first embodiment. Hereinafter, in the configuration diagram of the current feedback control of each embodiment, the configuration of the first microcomputer 401 is shown as a representative example, and the voltage, current and the like are represented using symbols of the first system. Further, the first system is assumed to be the own system and the second system is assumed to be the other system. The configuration of the current feedback control and the operation of the power supply current balancing process are the same for the second microcomputer 402. Hereinafter, single asterisk or star mark * is added to the symbol of a command value before limitation by the power supply current balancing process, that is, a pre-limit command value, and double asterisk or star marks ** is added to the symbol of the command value after limitation, that is, post-limit command value. Thus, in case of no limitation, the command value after limitation will be the same value as the command value before the limitation.

First, a general current feedback control configuration will be briefly described. In the example shown in FIG. 9, "sum and difference control" which is conventional is adopted as the two-system current feedback control. Alternatively, the configuration of the current feedback control independent of each system may be adopted. The first microcomputer 401 includes a current command value calculation unit 41, a current feedback calculation unit 43, a system voltage calculation unit 44, a two-phase to three-phase conversion unit (two-three conversion unit) 46, a PWM conversion unit 47, and a three-phase to two-phase conversion unit (three-two conversion unit) 48, a dq-axis current sum and difference calculation unit 49, and the like. Among these, description of well-known techniques such as coordinate conversion by vector control and PWM conversion is omitted.

In the redundant configuration, it is basically assumed that the electrical characteristics of the two systems are the same. In a coordinated operation, the current command value calculated by a master system is communicated to a slave system through an inter-computer communication between microcomputers, and a common current command value shared by the two systems is used to control the current supply between the two systems. Also in the first embodiment, the microcomputers 401 and 402 operate the two systems in a coordinated manner based on the common current command values Id* and Iq* at least before the execution of the power supply current balancing process.

In this case, the current command values Id1* and Iq1* of the first system calculated by the current command value calculation unit 41 of the first microcomputer 401 are supplied to the second microcomputer 402, and the same values are used as the current command values Id2* and Iq2* of the second system. It may be considered that the current command value calculation unit 41 calculates the current command values for two systems, and half of the values are distributed to each system. The current feedback calculation unit 43 receives doubled values of the current command values Id1* and Iq1* as Id*sum and Iq* sum, respectively, and 0 as Id* difference and Iq* difference.

However, in some cases, the post-limit current command values Id2 and Iq2 of the second system may be different from the post-limit current command values Id1 and Iq1 of the first system. In this case, as indicated by the broken line, the post-limit current command values Id2 and Iq2 acquired by the inter-computer communication may be input to the current feedback calculation unit 43, and the "Id* sum, Iq* sum, Id* difference and Iq* difference may be calculated.

The dq-axis current sum and difference calculation unit 49 calculates the Id sum, Iq sum, Id difference and Iq difference based on the dq-axis currents Id1 and Iq1 of the first system calculated by the three-phase to two-phase conversion unit 48 and the dq-axis currents Id2 and Iq2 of the second system acquired by the inter-computer communication, and feeds back to the current feedback calculation unit 43. The current feedback calculation unit 43 calculates Vd* sum, Vq*sum, Vd* difference and Vq* difference by PI (proportional and integral) calculation or the like. Based on this, the system voltage calculation unit 44 calculates the voltage command values Vd1* and Vq1* of the first system.

Next, a configuration unique to the first embodiment will be described. The ECU 101 of the first embodiment includes the estimated power supply current calculation unit 51, the current command value limit calculation unit 52, and the current command limitation unit 42 as a configuration for the power supply current balancing process. As described above, the power supply current sensor is not provided in the first to third embodiments, and the microcomputer 401 calculates the estimated power supply current Ib1_est.

The estimated power supply current calculation unit 51 calculates the estimated power supply current Ib1_est of the own system according to the following equation (1.1) based on the voltage command values Vd1*, Vq1* and the dq axis currents Id1, Iq1. The meaning of the reference voltage Vref in the equation (1.1) will be described later.

$$Ib1\_est = (Vd1^* \times Id1 + Vq1^* \times Iq1)/Vref \quad (1.1)$$

The current command limit calculation unit 52 acquires the estimated current Ib1_est of the own system estimated by the power supply current calculation unit 51, and acquires the estimated power supply current Ib2_est of the other system through the inter-computer communication. The current command limit calculation unit 52 calculates the limit gain or limit value of the current command values Id1* and Iq1* based on the estimated power supply currents Ib1_est and Ib2_est of the own system and supplies them to the current command limitation unit 42. Specific calculation of the limit gain or limit value will be described later with reference to FIG. 14. The current command limitation unit 42 limits the current command values Id1* and Iq1* and outputs the post-limit current command values Id1 and Iq1 to the current feedback calculation unit 43.

Figure 10A:
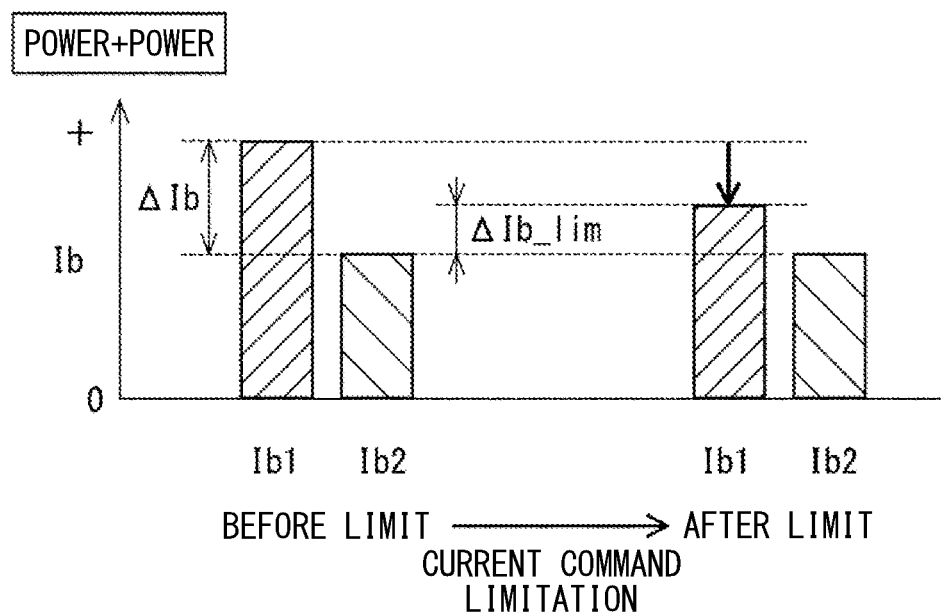
FIG. 10A and FIG. 10B are diagrams for explaining operations of a power supply current balancing process executed by limiting a current command value in a power running and power running state, and in a power running and regeneration state, respectively.
Figure 10B:
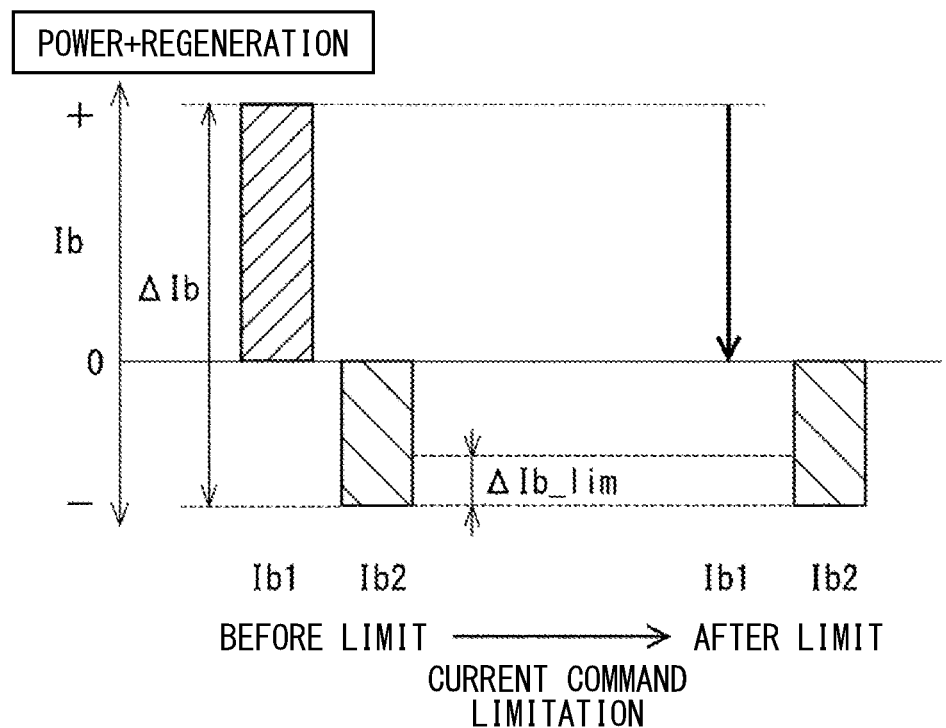

Next, the operation of the power supply current balancing process by limiting the current command value will be described with reference to FIG. 10A and FIG. 10B. FIG. 10A and FIG. 10B show cases where the pre-limit power supply current Ib1 of the first system is larger than a value which is determined by adding the target power supply current difference ΔIb_lim to the power supply current Ib2 of the second system. Other cases where the pre-limit power supply current Ib2 of the second system is larger than the value which is determined by adding the target power supply current difference ΔIb_lim to the power supply current Ib1 of the first system are also estimated in the similar manner.

In the powering running and power running state (power+power state) shown in FIG. 10A, the first microcomputer 401 reduces the power supply current Ib1 of the first system to the value determined by adding the target power supply current difference ΔIb_lim to the power supply current Ib2 of the second system thereby to limit the current command values Id1* and Iq1*.

As described above, the current command limitation unit 42 of the first microcomputer 401 is configured to limit the current command values Id1* and Iq1* of the own system so that the power supply current difference ΔIb is equal to or smaller than the target power supply current difference ΔIb_lim, when the power supply currents Ib1 and Ib2 of the own system and the other system are positive and the power supply current Ib1 of the own system is larger than the value determined by adding the target power supply current power supply current difference ΔIb to the power supply current Ib2 of the other system.

FIG. 10B shows an example of the power running and regeneration state (power+regeneration state) in which the first system is in the power running state and the second system is in the regeneration state. The first microcomputer 401 limits the current command values Id1* and Iq1* so as to decrease the power supply current Ib1 of the first system from positive value to zero. On the other hand, in the second system which is in the regeneration state, the negative power supply current Ib2 cannot be brought close to 0 due to the limitation of the current command values Id2* and 1q2* and hence the post-limit power supply current Ib2 does not change from the value of the pre-limit. As a result, the post-limit power supply current difference ΔIb becomes smaller than the pre-limit value. However, when the power supply current Ib2 of the second system is smaller than −ΔIb_lim, the post-limit power supply current difference ΔIb becomes larger than the target power supply current difference ΔIb_lim.

As described above, the current command limitation unit 42 of the first microcomputer 401 limits the current command values Id1* and Iq1* of the own system so that at least the power supply current difference ΔIb is decreased, when the power supply current Ib1 of the own system is positive and the power supply current Ib1 of the own system is larger than the value determined by adding the target power supply current difference ΔIb_lim to the power supply current Ib2 of the other system.

Second Embodiment

Figure 11:
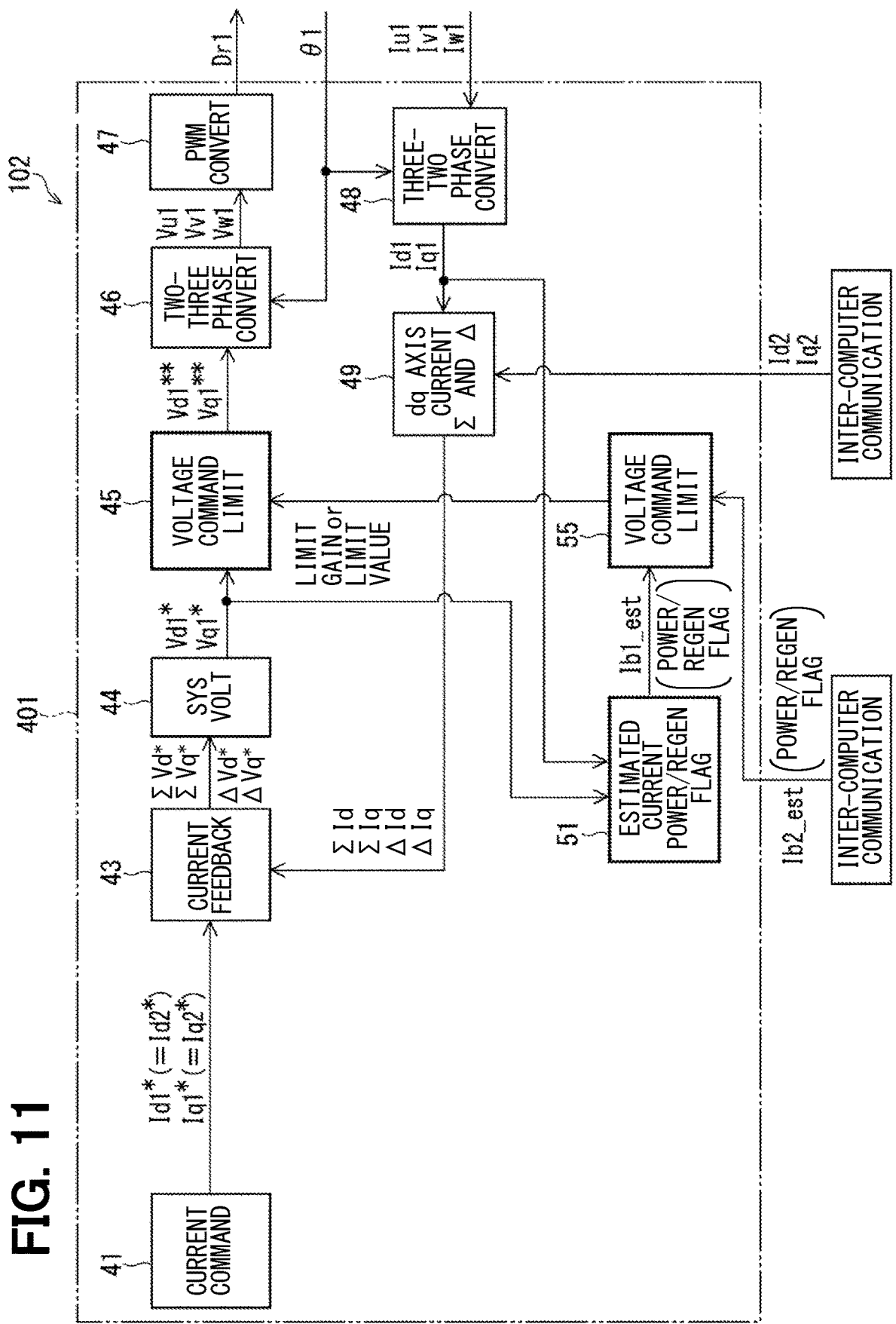
FIG. 11 is a block diagram of current feedback control according to a second embodiment.

Next, a second embodiment for limiting the voltage command value will be described with reference to FIG. 11 to FIG. 13. FIG. 11 shows a configuration of current feedback control of an ECU 102 of the second embodiment. Differences from the ECU 101 of the first embodiment will be described. The ECU 102 has a voltage command limit calculation unit 55 in place of the current command limit calculation unit 52 of the ECU 101 as a configuration for a power supply current balancing process, and a voltage command limitation unit 45 in place of the current command limitation unit 42.

The voltage command limit calculation unit 55 acquires the estimated power supply current Ib1_est of the own system calculated by the estimated power supply current calculation unit 51, and acquires the estimated power supply current Ib2_est of the other system through the inter-computer communication. The voltage command limit calculation unit 55 calculates a limit gain or limit value of voltage command values Vd1* and Vq1* based on the estimated power supply currents Ib1_est and Ib2_est of the own system and the other system and supplies them to the voltage command limitation unit 45. The voltage command limitation unit 45 limits the voltage command values Vd1* and Vq1*, and outputs post-limit voltage command values Vd1 and Vq1 to the two-three phase conversion unit 46.

Figure 12A:
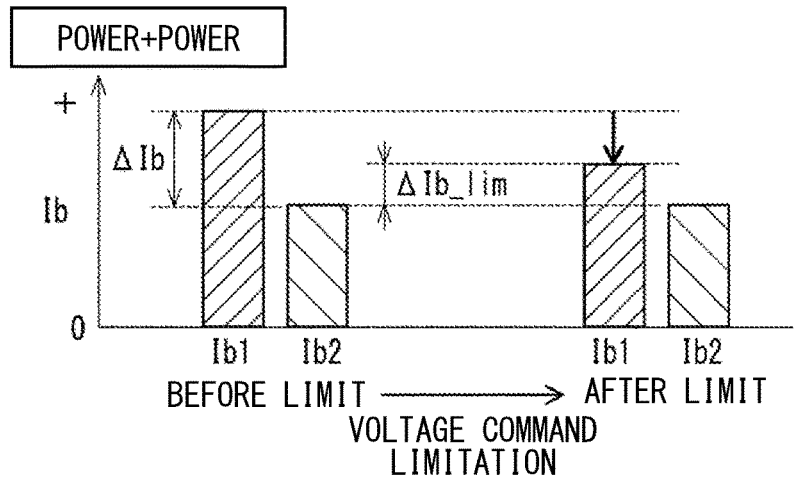
FIG. 12A, FIG. 12B and FIG. 12C are diagrams for explaining operations of a power supply current balancing process executed by limiting a current command value in a power running and power running state, in a first power running and regeneration state (1) and in a second power running and regeneration state (2), respectively.
Figure 12B:
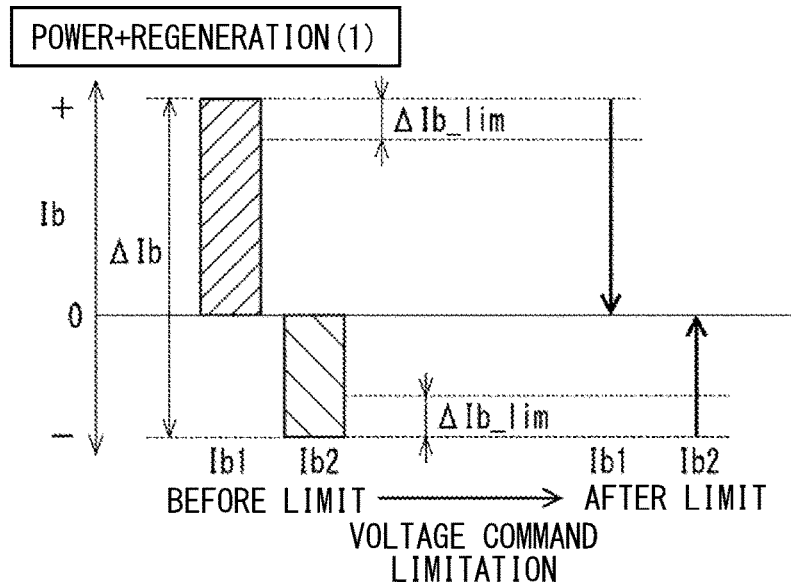
Figure 12C:
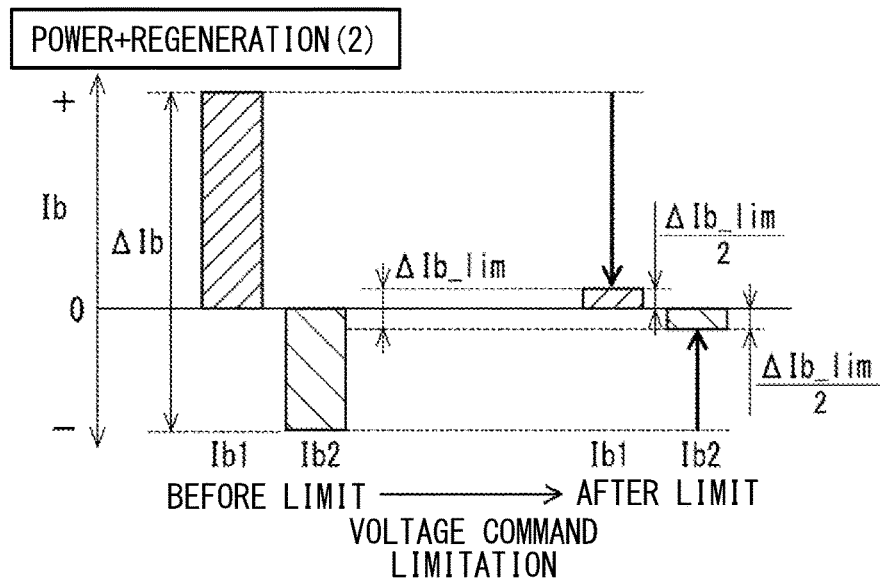

Next, the operation of the power supply current balancing process executed by limiting the voltage command value will be described with reference to FIG. 12A to FIG. 12C and FIG. 13. FIG. 12A to FIG. 12C show cases where the pre-limit power supply current Ib1 of the first system is larger than the value which is determined by adding the target power supply current difference ΔIb_lim to the power supply current Ib2 of the second system.

The power running and power running state shown in FIG. 12A is the same as the case of limiting the current command value shown in FIG. 10A. That is, the first microcomputer 401 limits the voltage command values Vd1* and Vq1* so as to decrease the power supply current Ib1 of the first system to the value determined by adding the target power supply current difference ΔIb_lim to the power supply current Ib2 of the second system.

FIG. 12B and FIG. 12C show two examples (1) and (2) in the power running and regeneration state in which the first system is in the power running state and the second system is in the regeneration state. In the example (1) shown in FIG. 12B, the first microcomputer 401 limits the voltage command values Vd1* and Vq1* so as to decrease the power supply current Ib1 of the first system from the positive value to zero. The second microcomputer 402 limits the voltage command values Vd2* and Vq2* so as to increase the power supply current Ib2 of the second system from the negative value to zero. As a result, the post-limit power supply current difference ΔIb becomes 0, and equal to or smaller than the target power supply current difference ΔIb_lim.

In the example (2) shown in FIG. 12C, the target power supply current Ib_lim of each system is set so that the target power supply current difference ΔIb_lim is divided into two with the power supply current Ib being zero. The first microcomputer 401 limits the voltage command values Vd1* and Vq1* so as to decrease the power supply current Ib1 of the first system from the positive value to +ΔIb_lim/2. The second microcomputer 402 limits the voltage command values Vd2* and Vq2* so as to increase the power supply current Ib2 of the second system from the negative value to −ΔIb_lim/2. As a result, the post-limit power supply current difference ΔIb becomes the target power supply current difference ΔIb_lim.

It is noted that, in the power supply current balancing process in the power running and regeneration state, any one of the following limitations may be selected: [1] the power running side system is preferentially limited; [2] the regeneration side system is preferentially limited; and [3] both systems are limited at the same ratio. Further, the limitation may be switched by providing a conditional branch corresponding to a magnitude of the power supply current difference ΔIb.

As described above, the voltage command limitation unit 45 of the first microcomputer 401 is configured to limit the voltage command values Vd1* and Vq1* of the own system so that the power supply current difference ΔIb is equal to or smaller than the target power supply current difference ΔIb_lim, when the power supply currents Ib1 of the own system is positive and the power supply current Ib1 of the own system is larger than the value determined by adding the target power supply current power supply current difference ΔIb_lim to the power supply current Ib2 of the other system.

Figure 13:
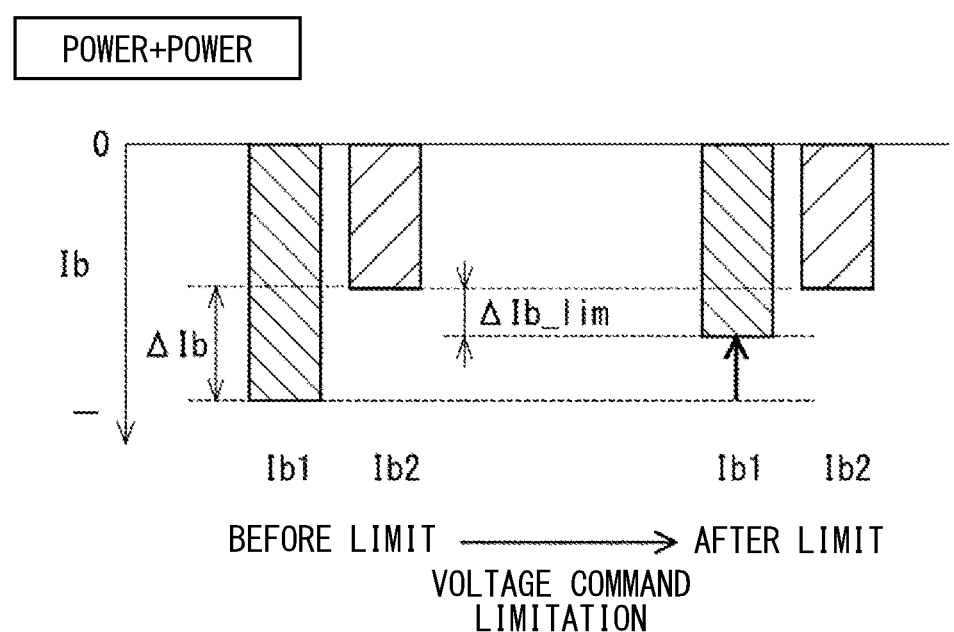
FIG. 13 is a diagram for explaining an operation of a power supply current balancing process executed by limiting a voltage command value in a regeneration and regeneration state.

The operation in the regeneration and regeneration state shown in FIG. 13 is opposite to the operation of the power running and power running state shown in FIG. 12A. FIG. 13 shows a case where the pre-limit negative power supply current Ib1 of the first system is smaller than the value determined by subtracting the target power supply current difference ΔIb_lim from the negative power supply current Ib2 of the second system. The first microcomputer 401 limits the voltage command values Vd1* and Vq1* so as to increase the power supply current Ib1 of the first system to a value determined by subtracting the target power supply current difference ΔIb_lim from the power supply current Ib2 of the second system.

As described above, the voltage command limitation unit 45 of the first microcomputer 401 is configured to limit the voltage command values Vd1* and Vq1* of the own system so that the power supply current difference ΔIb is equal to or smaller than the target power supply current difference ΔIb_lim, when the power supply currents Ib1 and Ib2 of the own system and the other system are negative and the power supply current Ib1 of the own system is smaller than the value determined by subtracting the target power supply current difference ΔIb_lim from the power supply current Ib2 of the other system.

(Power Supply Current Balancing Process)

Figure 14:
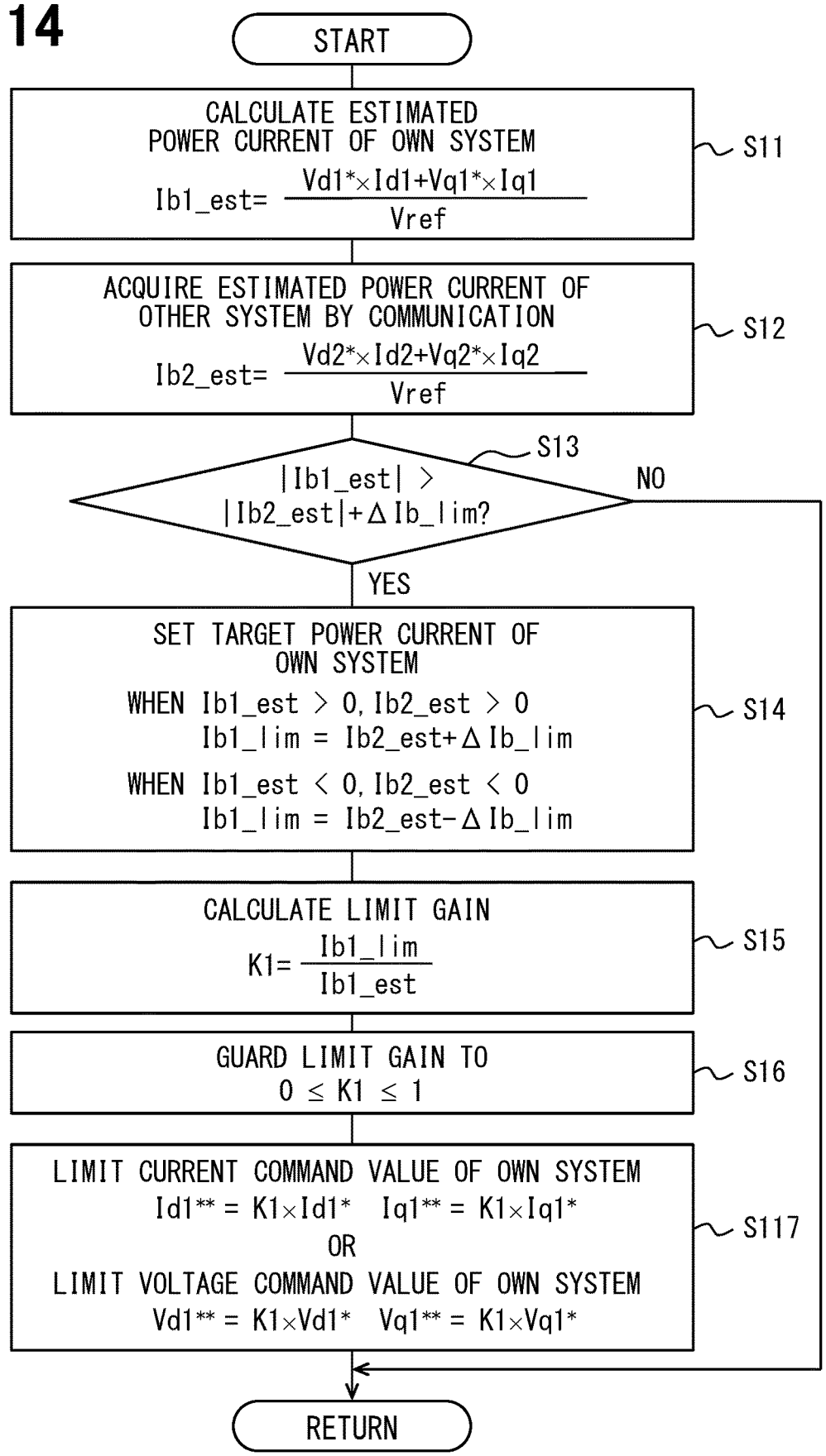
FIG. 14 is a flowchart of a power supply current balancing process executed based on estimated power supply currents of an own system and the other system.
Figure 15:
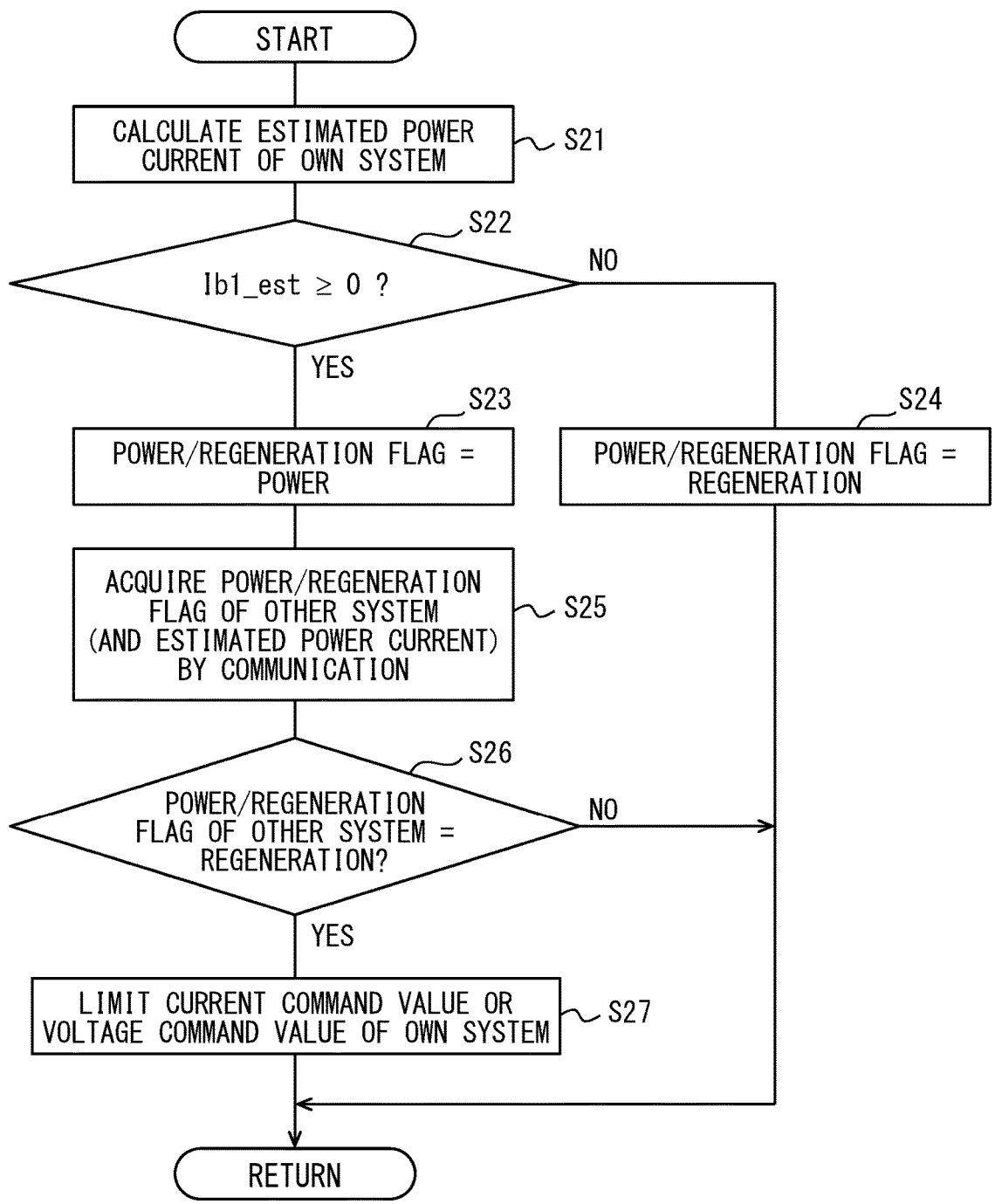
FIG. 15 is a flowchart of a power supply current balancing process executed based on operation states of an own system and the other system.

Next, the power supply current balancing process including the first and second embodiments will be described with reference to flowcharts of FIG. 14 and FIG. 15. In the following flowcharts, a symbol S indicates a step in the process. In FIG. 14 and FIG. 15, the first system is assumed to be the own system and the second system is assumed to be the other system, and symbols of each value are represented.

FIG. 14 shows a process in which each microcomputer sets the target power supply current based on the estimated power supply currents of the own system and the other system and limits the current command value or the voltage command value of the own system. FIG. 15 shows a process in which each microcomputer checks the operation state of the own system and acquires the operation state of the other system. This process limits the current command value or the voltage command value of only the own system, that is, only the system in the power running state, when the own system is in the power running state and the other system is in the regeneration state.

In S11 of FIG. 14, the estimated power supply current calculation unit 51 calculates the estimated power supply current Ib1_est of the own system in accordance with the equation (1.1) and based on the voltage command values Vd1*, Vq1*, the actual currents Id1, Iq1 and the reference voltage Vref. The estimated power supply current Ib1_est of the own system is output to the current command limit calculation unit 52 or the voltage command limit calculation unit 55.

$$Ib1\_est=(Vd1^* \times Id1+Vq1^* \times Iq1)/Vref \quad (1.1)$$

In the other system, the estimated power supply current Ib2_est is calculated by the similar equation (1.2). In S12, the current command limit calculation unit 52 or the voltage command limit calculation unit 55 acquires the estimated power supply current Ib2_est of the other system through inter-computer communication.

$$Ib2\_est=(Vd2^* \times Id2+Vq2^* \times Iq2)/Vref \quad (1.2)$$

The reference voltage Vref in the equations (1.1) and (1.2) is a common constant not dependent on an inverter voltage Vpig, which is, for example, 12 [V]. Here, the equations are derived as follows. The voltage and current symbols are indicated without the system number. The voltage command values Vd* and Vq* are calculated assuming that the inverter voltage Vpig is the reference voltage Vref. On the other hand, an actual d-axis voltage Vd_real and an actual q-axis voltage Vq_real are values reflecting the inverter voltage Vpig. Accordingly, since a denominator and a numerator Vpig are canceled in the second row of the following equation (2), the power supply current Ib is calculated by the reference voltage Vref.

$$\begin{aligned}Ib &= (Vq\_real \times Iq + Vd\_real \times Id)/Vpig \quad (2)\\ &= (Vpig \times Vq^* \times Iq/Vref + Vpig \times Vd^* \times Id/Vref)/Vpig\\ &= (Vq^* \times Iq + Vd^* \times Id)/Vref\end{aligned}$$

Next, S13 to S16 in FIG. 14 show an example in which the limit gain is calculated by the current command limit calculation unit 52 or the voltage command limit calculation unit 55. In another example, the current command limit calculation unit 52 or the voltage command limit calculation unit 55 may calculate the current command value limit value or the voltage command value limit value and outputs the calculation result to the current command limitation unit 42 or the voltage command limitation unit 45.

S13 is premised on the case of the two estimated power supply currents Ib1_est and Ib2_est of both systems are both positive or negative, that is, the case of the power running and power running (power+power) or the case of the regeneration and regeneration (regeneration+regeneration). That is, the description will be made excluding the case of power running and regeneration (power+regeneration), in which polarity signs of the estimated power supply currents of the two systems are different. In S13, it is checked whether the absolute value |Ib1_est| of the estimated power supply current of the own system is larger than the value determined by adding the target power supply current difference ΔIb_lim to the absolute value |Ib2_est| of the estimated power supply current of the other system, that is, whether the following inequality equation (3) is satisfied.

$$|Ib1\_est|>|Ib2\_est|+\Delta Ib\text{lim} \quad (3)$$

In case the estimated power supply currents Ib1_est and Ib2_est of the own system and the other system are positive and the estimated power supply current Ib1_est of the own system is larger than the value determined by adding the target power supply current difference ΔIb_lim to the estimated power supply current Ib2_est of the other system, the check result in S13 is YES. Further, in case the estimated power supply currents Ib1_est and Ib2_est of the own system and the other system are negative and the estimated power supply current Ib1_est of the own system is smaller than the value determined by subtracting the target power supply current difference ΔIb_lim from the estimated power supply current Ib2_est of the other system, the check result in S13 is YES.

In case of YES in S13, S14 is executed. In case of NO in S13, the microcomputer of the own system finishes the process of FIG. 14. At this time, in case of YES in S13 executed in the other system, the limitation process of steps corresponding to S14 and subsequent steps is executed in the other system. In S14, the target power supply current Ib1_lim of the own system is calculated. Here, in case the estimated power supply currents Ib1_est and Ib2_est of the own system and the other systems are positive, the equation (4.1) is used. In case the estimated power supply currents Ib1_est and Ib2_est of the own system and the other systems are negative, the equation (4.2) is used.

$$Ib1\_lim=Ib2\_est+\Delta Ib\_lim \quad (4.1)$$

$$Ib1\_lim=Ib2\_est-\Delta Ib\_lim \quad (4.2)$$

Equations (4.1) and (4.2) are set in case of an allowable range limit of the power supply current difference ΔIb. However, the equations (4.1) and (4.2) may be set to Ib1_lim=Ib2_est in case that the power supply current difference ΔIb is 0. Further, in case of the power supply current difference ΔIb which is between 0 and the target power supply current difference ΔIb_lim, the right side of the equation (4.1) may be set to Ib2_est+0.5×ΔIb_lim, for example.

Next, in S15, a limit gain K1 is calculated by dividing the target power supply current Ib1_lim by the estimated power supply current Ib1_est of the own system by using the equation (5).

$$K1=Ib1\_lim/Ib1\_est \quad (5)$$

In S16, the limitation gain K1 is guarded to 0≤K1≤1. That is, it is thus possible to prevent the sign of the command value from being reversed due to the limitation and the absolute value of the original command value from increasing. The guarded limit gain K1 is output from the current command limit calculation unit 52 to the current command limitation unit 42 or from the voltage command limit calculation unit 55 to the voltage command limitation unit 45.

In S17, the current command value or voltage command value of the own system is limited. As shown in FIG. 10A and FIG. 12A, in case of the power running and power running, either the current command value or the voltage command value may be limited. As shown in FIG. 13, in case of the regeneration and regeneration, only the voltage command value is limited. It is noted that, in case of the power running and regeneration, which is not assumed in S13, the current command value is limited only in the system of the power running side as shown in FIG. 10B. Therefore, it is preferable that the voltage command value is limited as shown in FIG. 12B and FIG. 12C.

In case of limiting the current command value, the current command limitation unit 42 multiplies the pre-limit current command values Id1* and Iq1* by the limitation gain K1, respectively, according to the equations (6.1) and (6.2), thereby to calculate the post-limit current command values Id1 and Iq1.

$$Id1^{**}=K1 \times Id1^* \quad (6.1)$$

$$Iq1^{**}=K1 \times Id1^* \quad (6.2)$$

When limiting the voltage command value, the voltage command limitation unit 45 multiplies the pre-limit voltage command values Vd1* and Vq1* by the limitation gain K1 according to the following equations (7.1) and (7.2), respectively, thereby to calculate the post-limit voltage command values Vd1 and Vq1.

$$Vd1^{**}=K1 \times Vd1^* \quad (7.1)$$

$$Vq1^{**}=K1 \times Vq1^* \quad (7.2)$$

Alternatively, the post-limit current command values Id, Iq and the post-limit voltage command values Vd, Vq may be calculated by other conventional methods. In one conventional method, for example, a d-axis current limit value is calculated based on a target power supply current, dq-axis voltage command values and a q-axis current detection value. In this conventional method, a q-axis current limit value is calculated based on the target power supply current, the dq-axis voltage command values, and a d-axis current detection value.

In case of the conventional method described above, the post-limit current command values Id and Iq for the power running and power running state are calculated by the following equations (8.1) and (8.2), and the current command value Is limited in each system. Here, the target power supply current Ib_lim is calculated by the above equation (4.1) using the estimated power supply current Ib1_est of the other system. It is noted that the current command values Id* and Iq* may be used in place of the current detection values Id and Iq.

$$Id^{**}=(Ib\_\mathrm{lim} \times Vref - Vq^* \times Iq)/Vd^* \quad (8.1)$$

$$Iq^{**}=(Ib\_\mathrm{lim} \times Vref - Vd^* \times Id)/Vq^* \quad (8.2)$$

In another conventional method which is for a single system, a power supply current target value X (>0) in a regeneration state is divided by an absolute value of an estimated power supply current |Ib_est| thereby to calculate a restriction gain Kres (=X/|Ib_est|. In this method, post-limit voltage command values Vd and Vq are calculated by multiplying pre-limit voltage command values Vd* and Vq* by the restriction gain Kres.

In the power running and regeneration state shown in FIG. 12B and FIG. 12C, the voltage command value of the regeneration side system may be first limited by the conventional method described above, and the voltage command value or the current command value of the power running side system may be limited when the power supply current difference ΔIb still remains to be larger than the target power supply current difference ΔIb_lim.

In addition, when applying the conventional method in the regeneration and regeneration state shown in FIG. 13, a smaller value of the suppression gains calculated in the own system and the other system may be set as a post-restriction suppression gain. In each system, the post-limit voltage command values Vd and Vq may be calculated by multiplying the pre-limit voltage command values Vd* and Vq*.

Reference is made next to the a flowchart shown in FIG. 15. This process assumes the power running and regeneration state shown in FIG. 10B, FIG. 12B and FIG. 12C, and mainly switches over processes depending on whether the operation state of each system is the power running state or the regeneration state. That is, each of the microcomputers 401 and 402 checks the operation state of the own system and acquires the operation state of the other system through the inter-computer communication. When the own system is in the power running state and the other system is in the regeneration state, the current command value or the voltage command value of only the own system, that is, the power running side system is limited as the power supply current balancing process.

In S21, the estimated power supply current calculation unit 51 calculates the estimated power supply current Ib1_est of the own system, similarly to S11 of FIG. 14. In S22, it is checked whether the estimated power supply current Ib1_est is 0 or larger than 0. In case the check result in S22 is YES, a power running/regeneration flag is set to the power running state in S23, and then S25 is executed. In case the check result in S22 is NO, the power running/regeneration flag is set to the regeneration state in S24, and this routine is finished.

In S25, the current command limit calculation unit 52 or the voltage command limit calculation unit 55 acquires the power running/regeneration flag of the other system through the inter-computer communication. At this time, the current command limit calculation unit 52 or the voltage command limit calculation unit 55 may further acquire the estimated power supply current Ib2_est of the other system. In S26, it is checked whether the power running/regeneration flag of the other system is the regeneration state. In case the check result in S26 is YES, S27 is executed. In case the check result in S26 is NO, the routine is finished.

In S27, the current command limitation unit 42 limits the current command values Id1* and Iq1*, or the voltage command limitation unit 45 limits the voltage command values Vd1* and Vq1*. In this case, as shown in FIG. 10B and FIG. 12B, the target power supply current Ib1_lim of the own system may be set to 0 regardless of the value of the estimated power supply current Ib2_est of the other system. Alternatively, when the estimated power supply current Ib2_est of the other system is (−ΔIb_lim)<Ib2_est<0, the target power supply current Ib1_lim of the own system may be set to Ib2_est+ΔIb_lim.

Third Embodiment

Figure 16:
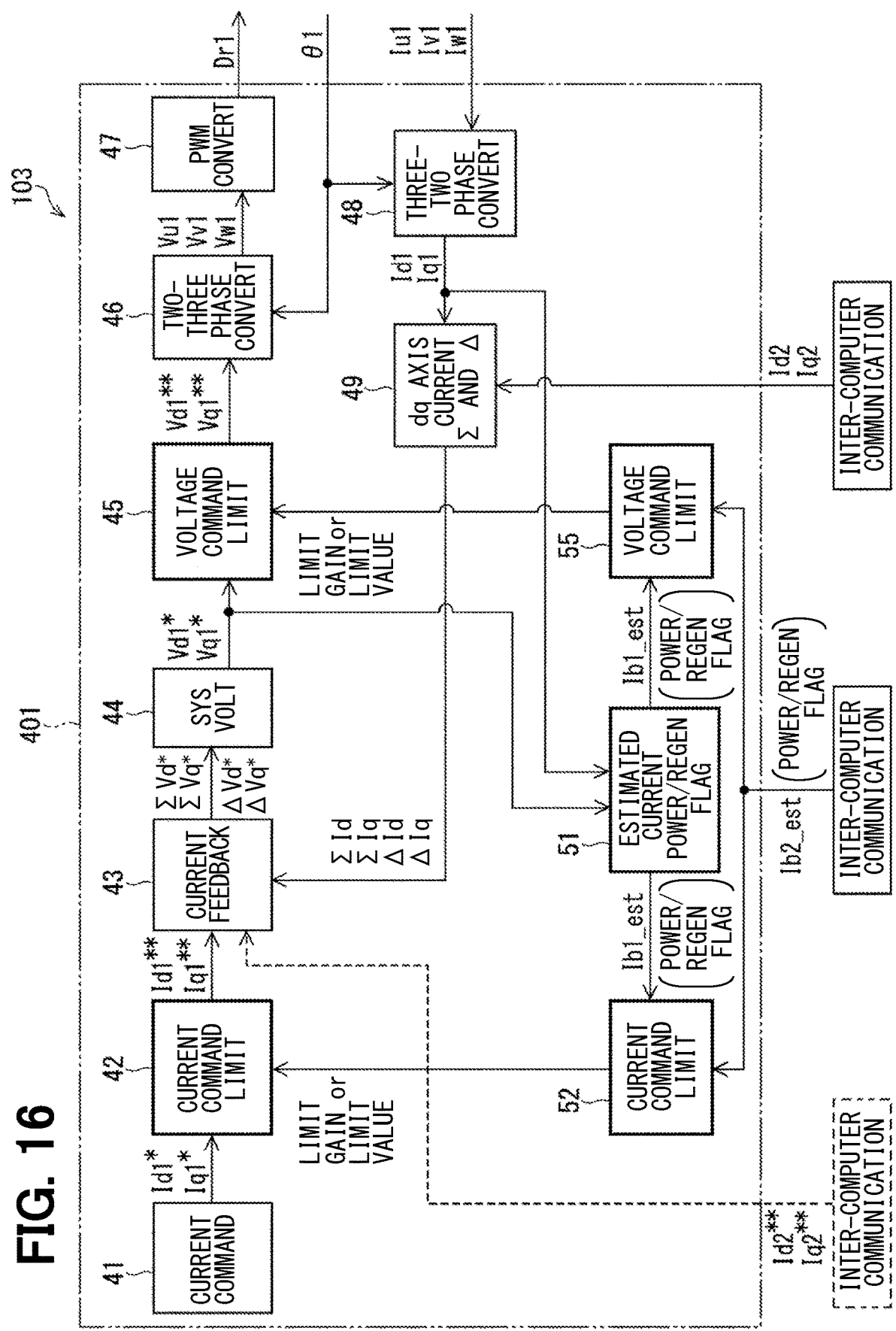
FIG. 16 is a block diagram of current feedback control according to a third embodiment.

FIG. 16 shows a configuration of current feedback control of an ECU 103 of the third embodiment. The ECU 103 has a configuration in which the ECUs 101 and 102 of the first embodiment and the second embodiment are combined. The ECU 103 limits both the current command value and the voltage command value in the power supply current balancing process. Regarding the configuration of each part, same description is not made for simplification.

In principle, the ECU 103 may limit, depending on the operation state, both the current command value and the voltage command value or may limit either one of the current command value and the voltage command value. For example, the current command value may be limited in the power running and power running state, and the voltage command value may be limited in the power running and regeneration state or the regeneration and regeneration state. For example, in the power running and regeneration state shown in FIG. 12C, the first microcomputer 401 limits the current command values Id1* and Iq1* in the first system which is in the power running state, and the second microcomputer in the second system which is in the regeneration state may limit the voltage command values Vd2* and Vq2*. Thus, in the third embodiment, the power supply current balancing process can be executed flexibly according to various operation states.

Effects of the First to Third Embodiments (1) In the present embodiment, each of the microcomputers 401 and 402 performs the power supply current balancing process so that the power supply current difference ΔIb between the two systems is decreased when the power supply current difference ΔIb between the two systems exceeds the target power supply current difference ΔIb_lim. This makes it less likely that the inter-computer communication abnormality occurs due to a ground potential difference between the systems.

Preferably, each of the microcomputers 401 and 402 executes the power supply current balancing process so that the power supply current difference ΔIb between the two systems is equal to or smaller than the target power supply current difference ΔIb_lim. In particular, in the second and third embodiments, even when one or both systems are in the regeneration state, the voltage command values Vd* and Vq* are limited so that the power supply current difference ΔIb between the two systems is equal to or smaller than the target power supply current difference ΔIb_lim. Thereby, the communication abnormality between the microcomputers due to the ground potential difference between the systems is less likely to occur.

(2) In the present embodiment, each of the microcomputers 401 and 402 operates the two systems in a coordinated manner based on the common current command values Id* and Iq* at least until starting the power supply current balancing process. In the coordinated operation, since the inter-computer communication plays an especially important role, it is particularly effective to suppress the occurrence of the inter-computer communication abnormality by the power supply current balancing process. In the second embodiment, the current command values Id* and Iq* are not changed and only the voltage command values Vd* and Vq* are limited to execute the power supply current balancing process while maintaining the coordinated operation.

(3) The ECUs 101 to 103 of the present embodiment are applied to the electric power steering apparatus 90 of the vehicle and control current supply to the steering assist motor 80. Since high reliability is required for the electric power steering apparatus 90 that controls the steering function of the vehicle, it is particularly effective to suppress the occurrence of inter-computer communication abnormality by the power supply current balancing process.

OTHER EMBODIMENT (A) The ECUs 101 to 103 of the above embodiments have the two-system configuration, and the two systems form a target system pair that is a target of power supply current balancing process. In addition, in case of an N-system motor control device in which N is three or more, one or more sets of two systems out of the N systems are selected as a target system pair. The target system pair is set as follows.

[i] In case the N systems includes one master system and (N−1) slave systems and the ground potentials of the microcomputers of all systems are independent of each other, N−1 sets of the target system pairs are set. The power supply current between the slave systems is not taken into account. In this case, the power supply current difference ΔIb between the slave systems may become twice the target power supply current difference ΔIb_lim at maximum. However, this will not be a problem as far as the inter-computer communication is performed only between the master system and each slave system.

[ii] In the same master/slave configuration as in [i] above, the power supply current balancing process is performed including each slave system. Theoretically, a target system pair of a combination ($_NC_2$) for selecting two systems from N systems may be set. Alternatively, after performing the power supply current balancing process once by the method [i], a secondary power supply current balancing process may be performed further by extracting the slave system, which has the largest power supply current difference on the positive side and the largest power supply current difference on the negative side relative to the master system as the target system pair.

[iii] The power supply balancing process need not be performed for a system, which does not perform the inter-computer communication with the other system of the N systems other than the first system and the second system among the N systems or the ground potential of the other system is common with the ground potential of the first system and the second system. Therefore, only the set of the first system and the second system may be set as the target system pair.

(B) The microcomputers 401 and 402 of the target system pair may monitor mutually information that can estimate the power supply current of each system in addition to the detection values Ib1_sns and Ib2_sns of the power supply current of each system or the estimated values Ib1_est and Ib2_est. For example, the microcomputers 401 and 402 may mutually monitor the detection value or the estimated value of the power of each system. The microcomputers 401 and 402 may also communicate the current detection values and the voltage command values with each other, and estimate the power supply current and the power of the other system based on the acquired signal.

(C) In another embodiment, the microcomputers 401 and 402 may calculate the current command values independently for each system without necessarily operating the two systems in the coordinated manner even before starting of the power supply current balancing process. Even in such a case, there remains a possibility that information such as an abnormal signal may be communicated with each other by the inter-computer communication. Therefore, it is effective to make it less likely for an abnormality in the inter-computer communication to occur by the power supply current balancing process.

(E) In the motor 80 which is to be controlled in the above embodiments, the phase difference between the two winding sets 801 and 802 is not limited to the electrical angle of 30 [deg] and may be arranged in the same phase, for example. In addition, the number of phases of the multi-phase brushless motor is not limited to three phases but may be four or more phases.

(E) The motor control device according to the present disclosure is not limited to the steering assist motor of the EPS, but may be applied to a motor for other applications mounted on a vehicle or a motor of a system other than the vehicle. Depending on the type and application of the motor, there is a possibility that the motor practically performs only the power running operation or only the regeneration operation. In that case, the power supply current balancing process may be specialized for the power running and power running state or the regeneration and regeneration state.

The present disclosure should not be limited to the embodiments described above, and various other embodiments may be implemented without departing from the scope of the present disclosure.

Control units and methods described in the present disclosure may be implemented by a special purpose computer which is configured with a memory and a processor programmed to execute one or more particular functions embodied in computer programs of the memory. Alternatively, the control unit described in the present disclosure and the method thereof may be realized by a dedicated computer configured as a processor with one or more dedicated hardware logic circuits. Alternatively, the control unit and the method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

What is claimed is:

1. A motor control device comprising at least two systems, which include an own system and an other system forming a target system pair, and capable of controlling current supply to a motor, wherein each system includes:
   a power converter configured to perform power conversion between a DC power input from an individual power supply and an AC power generated by the motor in accordance with a power running state and a regeneration state; and
   a microcomputer configured to execute processing of calculating a current command value of a current flowing in the motor, and calculating a voltage command value of a voltage of the power converter of the own system by feeding back an actual current relative to the current command value;
   each microcomputer of the target system pair is configured to communicate information of the own system and the other system by inter-computer communication and has an independent ground potential;
   each microcomputer of the target system pair monitors a detection value or an estimated value of the power supply current of each system by the inter-computer communication or information which enables estimation of the power supply current of each system, and executes a power supply current balancing process of limiting the current command value or the voltage command value of at least one of the systems thereby to decrease a power supply current difference between the two systems when the power supply current difference between the two systems exceeds a target power supply current difference.

2. The motor control device according to claim 1, wherein:
   each microcomputer in the target system pair is configured to execute a power supply current balancing process for limiting the current command value by a limiting process; and
   the limiting process limits the current command value of the own system to decrease the power supply current difference between the two systems, when the power supply current of the own system is a power running current flowing in the power running state and the power supply current of the own system is larger than a value determined by adding the target power supply current difference to a power supply current of the other system.

3. The motor control device according to claim 2, wherein:
   the limiting process limits the current command value of the own system to decrease the power supply current difference between the two systems to be equal to or smaller than the target power supply current difference, when the power supply current of each of the own system and the other system is the power running current flowing in the power running state and the power supply current of the own system is larger than the value determined by adding the target power supply current difference to the power supply current of the other system.

4. The motor control device according to claim 1, wherein:
   each microcomputer in the target system pair is configured to execute a power supply current balancing process for limiting the voltage command value by a limiting process; and
   the limiting process limits the voltage command value of the own system to decrease the power supply current difference between the two systems to be equal to or smaller than the target power supply current difference, when the power supply current of the own system is the power running current and the power supply current of the own system is larger than a value determined by adding the target power supply current difference to a power supply current of the other system, or when the power supply currents of the own system and the other system are regeneration currents flowing in the regeneration state and the power supply current of the own system is smaller than a value determined by subtracting the target power supply current difference from a power supply current of the other system.

5. The motor control device according to claim 1, wherein each microcomputer of the target system pair is configured to execute a process of:
   checking an operation state of the own system regarding the operation state or the regeneration state and acquiring an operation state of the other system by the inter-computer communication; and
   limiting the current command value or the voltage command value as the power supply current balancing process, when the own system is in the power running state and the other system is in the regeneration state.

6. The motor control device according to claim 1, wherein:
   each microcomputer of the target system pair is configured to execute a process of driving the two systems coordinately based on a common current command value at least until starting the power supply current balancing process.

7. An electric power steering apparatus comprising:
   a steering assist motor for assisting a steering operation in a vehicle; and the motor control device according to claim 1 provided to control the steering assist motor.

* * * * *